US006902048B1

(12) United States Patent
Chung

(10) Patent No.: US 6,902,048 B1
(45) Date of Patent: Jun. 7, 2005

(54) CLUTCH

(76) Inventor: Caleb Chung, 3460 Plantation River Dr., Boise, ID (US) 83703

( * ) Notice: Subject to any disclaimer, the term of this patent is extended or adjusted under 35 U.S.C. 154(b) by 0 days.

(21) Appl. No.: 09/549,727

(22) Filed: Apr. 14, 2000

Related U.S. Application Data

(60) Provisional application No. 60/129,519, filed on Apr. 14, 1999.

(51) Int. Cl.[7] .............................................. F16D 27/02
(52) U.S. Cl. ....................... 192/48.2; 192/80; 192/84.8
(58) Field of Search ........................ 192/40, 84.1, 84.8, 192/48.2, 80, 84.9, 84.91; 310/317; 318/135

(56) References Cited

U.S. PATENT DOCUMENTS

| 870,166 | A | | 5/1907 | Harter | |
|---|---|---|---|---|---|
| 2,928,515 | A | | 3/1960 | Laxo | 192/48 |
| 3,547,240 | A | | 12/1970 | Holper | 192/48.2 |
| 4,207,704 | A | | 6/1980 | Akiyama | 46/232 |
| 4,217,976 | A | | 8/1980 | DeJong | 192/84 |
| 4,239,095 | A | | 12/1980 | De Jong | 192/84 |
| 4,290,393 | A | | 9/1981 | Hart | 123/41.12 |
| 4,423,803 | A | | 1/1984 | Malloy | 192/3.29 |
| 4,561,529 | A | | 12/1985 | McIntosh | 192/56 R |
| 4,564,092 | A | | 1/1986 | Pierce | 192/48.2 |
| 4,665,334 | A | | 5/1987 | Jamieson | 310/306 |
| 4,700,541 | A | | 10/1987 | Gabriel et al. | 60/528 |
| 4,704,072 | A | * | 11/1987 | Nakajima et al. | 417/223 |
| 4,736,587 | A | | 4/1988 | Suzuki | 60/528 |
| 4,831,893 | A | | 5/1989 | Obama et al. | 74/479 |
| 4,875,565 | A | | 10/1989 | Depoli | 192/48.2 |
| 4,930,457 | A | | 6/1990 | Tamai | 123/41.12 |
| 4,973,024 | A | | 11/1990 | Homma | 251/11 |
| 5,013,276 | A | | 5/1991 | Garfinkel | 446/14 |
| 5,103,807 | A | | 4/1992 | Makaran | 128/26 |
| 5,166,832 | A | | 11/1992 | Zychowicz | 359/841 |
| 5,377,802 | A | | 1/1995 | Ide | 192/107 |
| 5,427,138 | A | | 6/1995 | Ochiai et al. | 137/468 |
| 5,545,103 | A | | 8/1996 | Gustin | 475/223 |
| 5,575,790 | A | | 11/1996 | Chen et al. | 606/60 |
| 5,823,845 | A | | 10/1998 | O'Berrigan | 446/234 |
| 6,216,973 | B1 | * | 4/2001 | Bauer | 242/384 |
| 6,452,350 | B1 | * | 9/2002 | Finkemeyer et al. | 318/372 |

FOREIGN PATENT DOCUMENTS

| DE | 40 09 626 A1 | | 11/1991 |
|---|---|---|---|
| JP | 58-211027 A | * | 12/1983 |

OTHER PUBLICATIONS

Duerig, et al., "Engineering Aspects of Shape Memory Alloys", 1990, pp. 148–169, Butterworth–Heinemann.
"Basic Research on the Development of Shape–Memory Alloy Thin Film for Microactuators", Shuichi Miyazaki, Institute of Materials Science, University of Tsukuba, pp. 1–2.

* cited by examiner

Primary Examiner—Saul Rodriguez
(74) Attorney, Agent, or Firm—Christie, Parker & Hale, LLP

(57) ABSTRACT

The present invention provides various clutch/gear assemblies that can be driven by a single motor. The clutch/gear assemblies comprise a smart material which changes shape when supplied with energy, e.g., current or heat. The smart material achieves one of a first or a second shape when supplied with energy, and achieves the other shape when it is not supplied with energy. When the smart material achieves a first shape it causes a clutch surface of the clutch/gear to engage and be driven by a shaft coupled to the motor and when the smart material achieves a second shape it allows the clutch surface to disengage from the shaft.

53 Claims, 26 Drawing Sheets

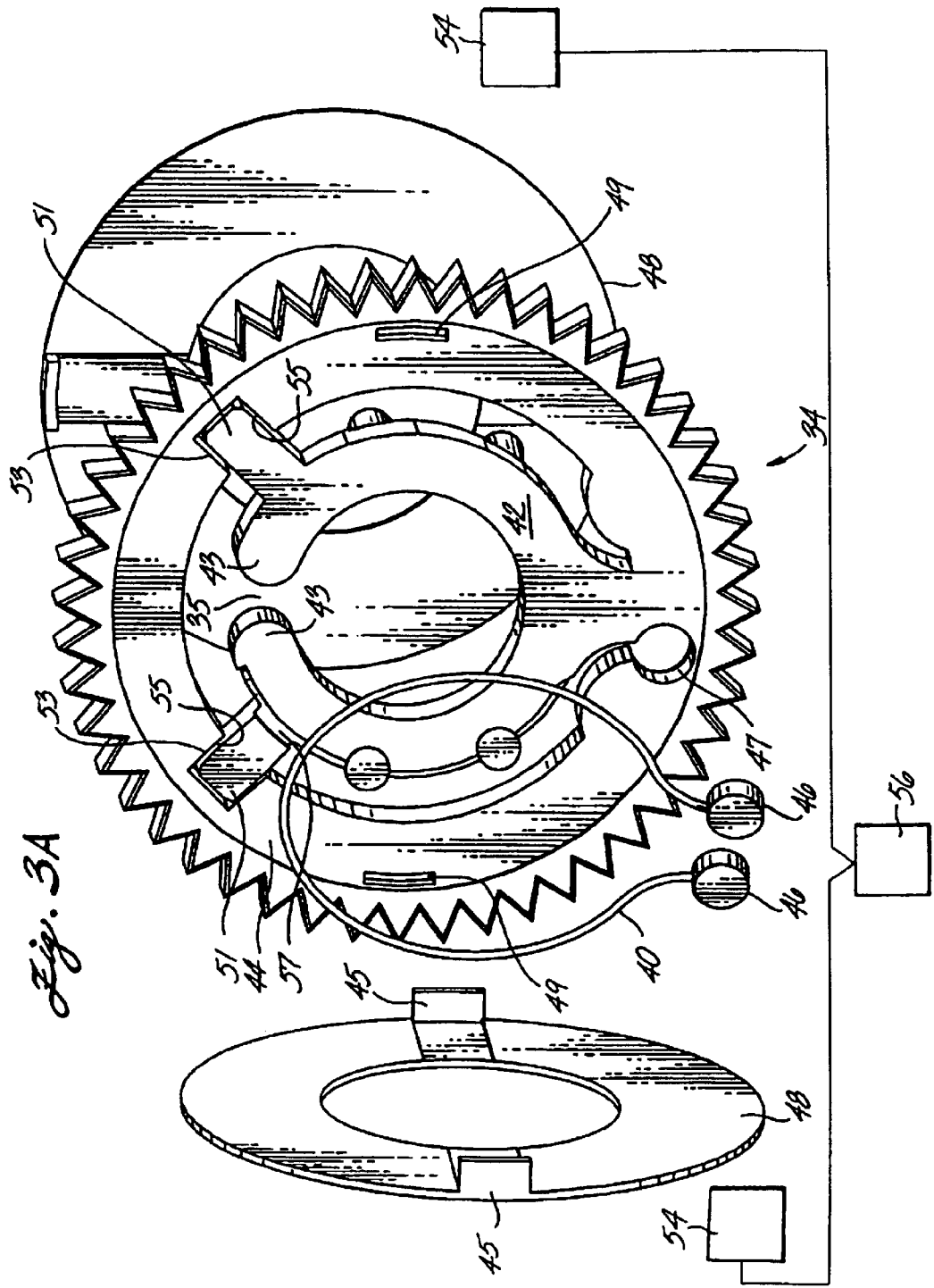

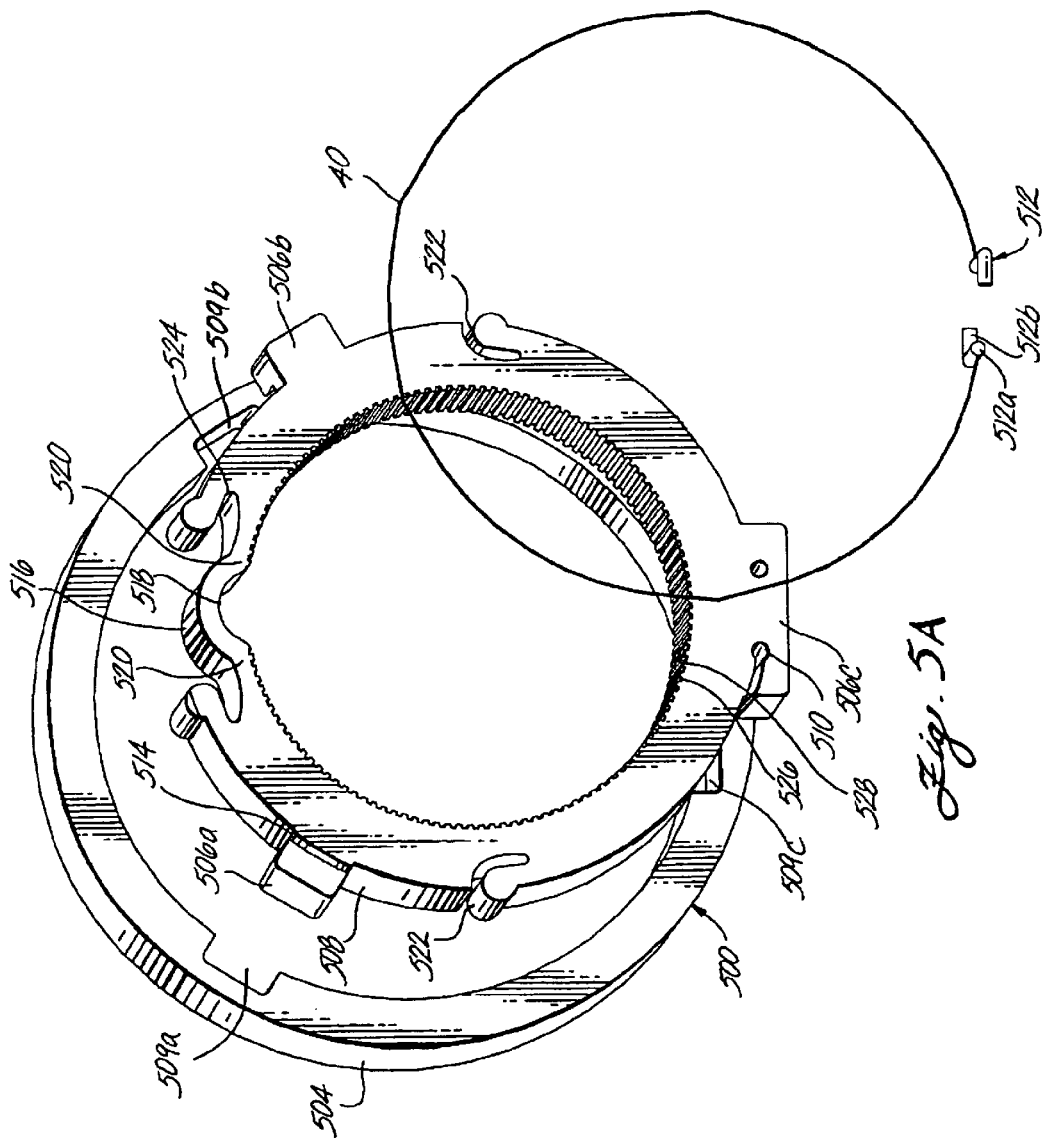

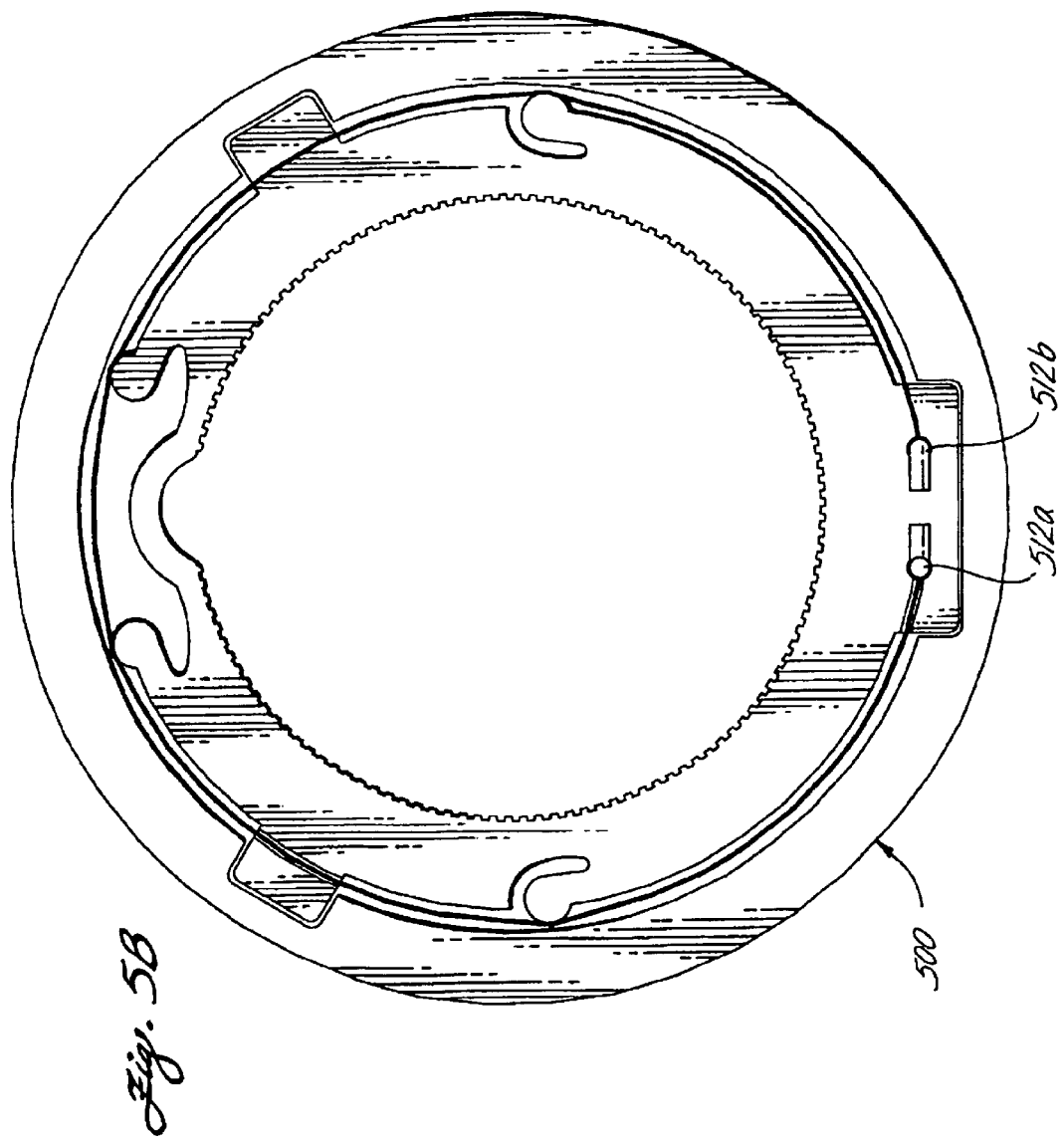

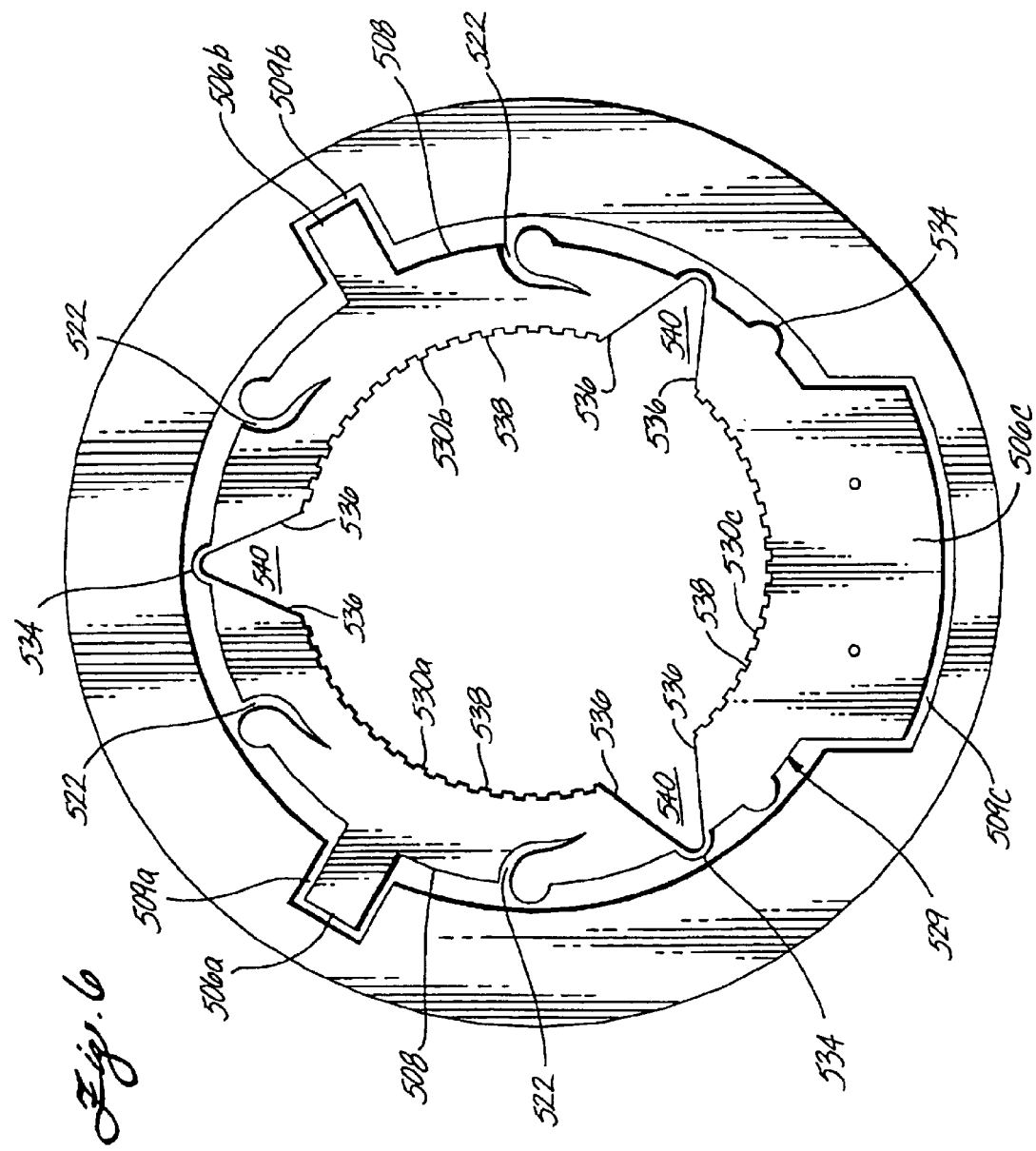

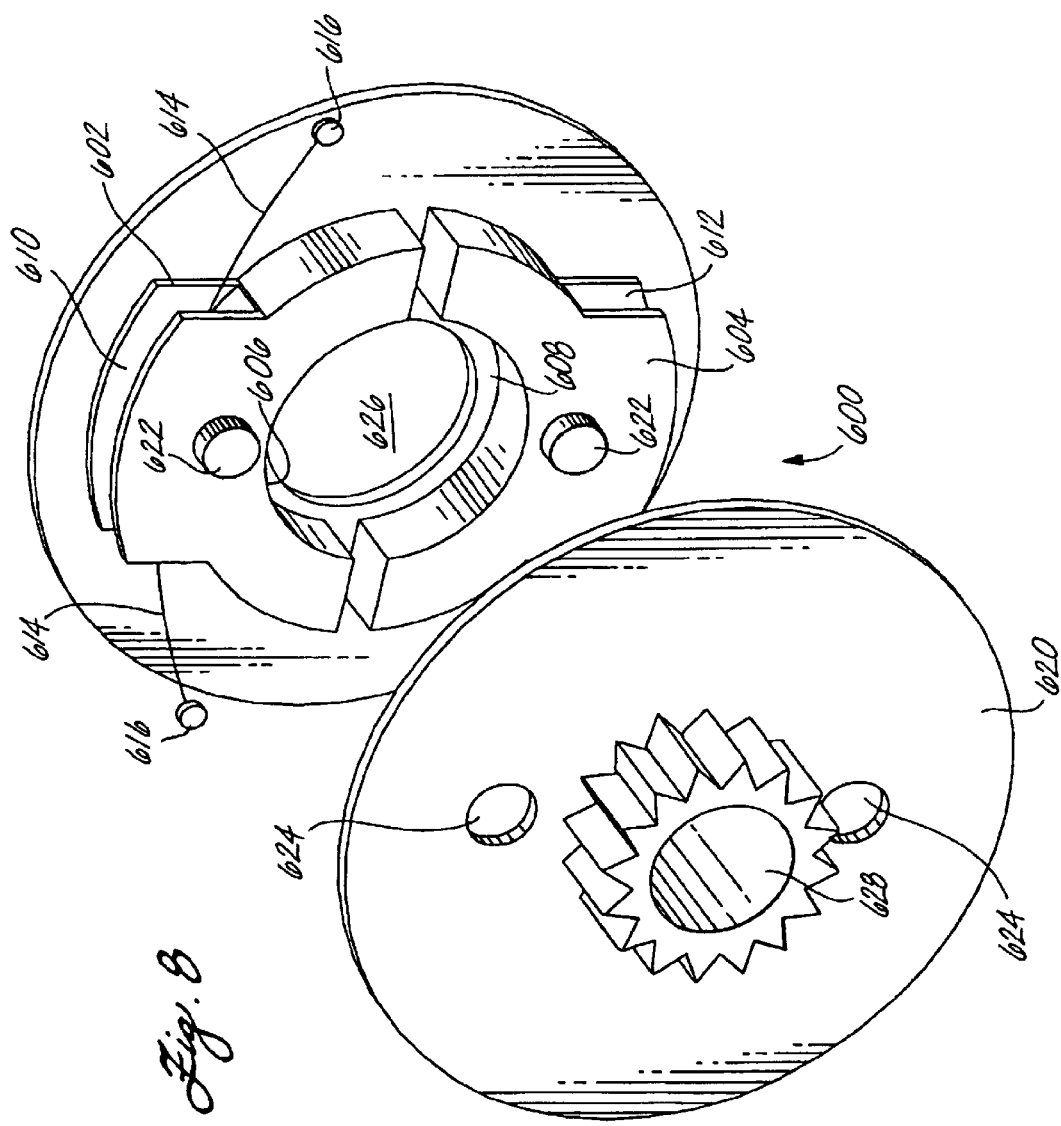

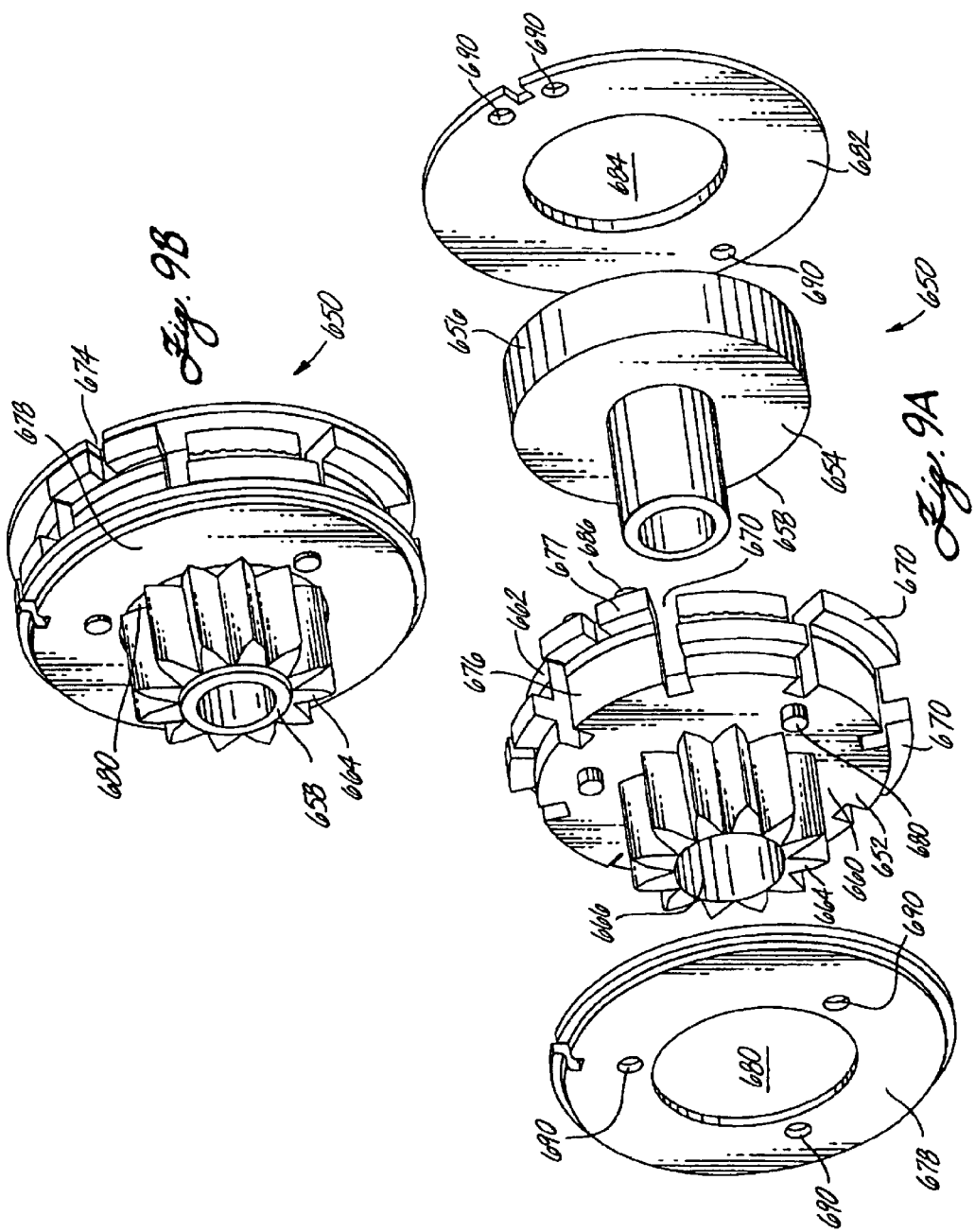

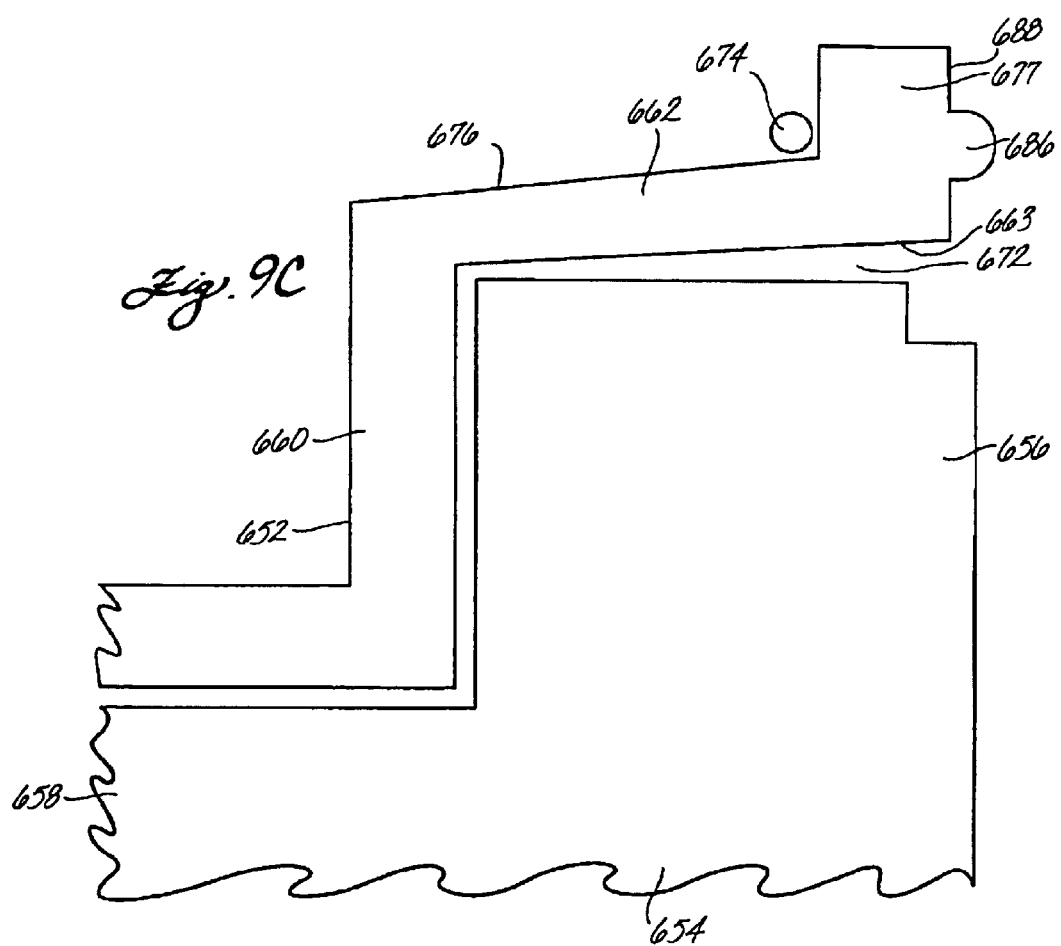

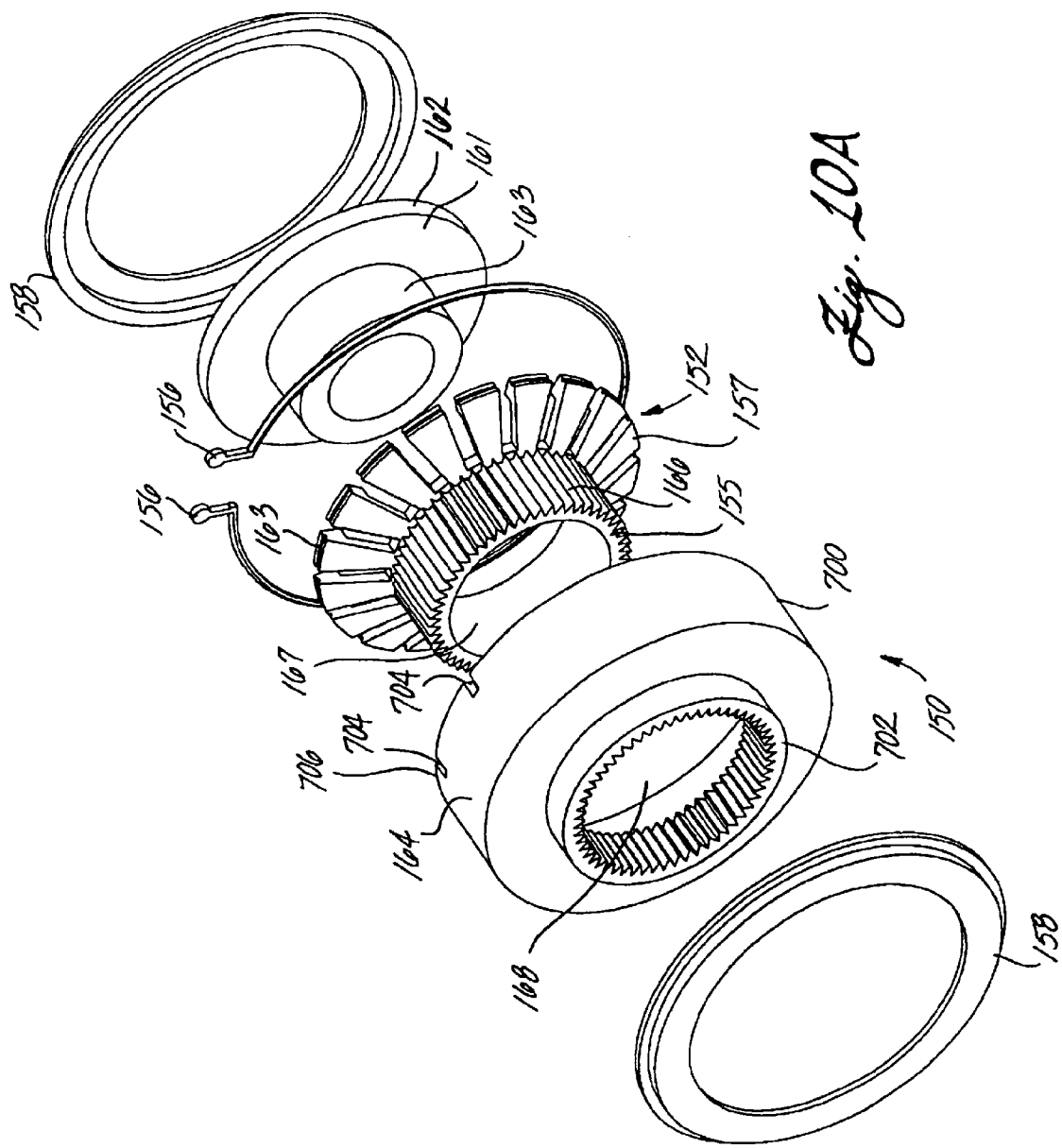

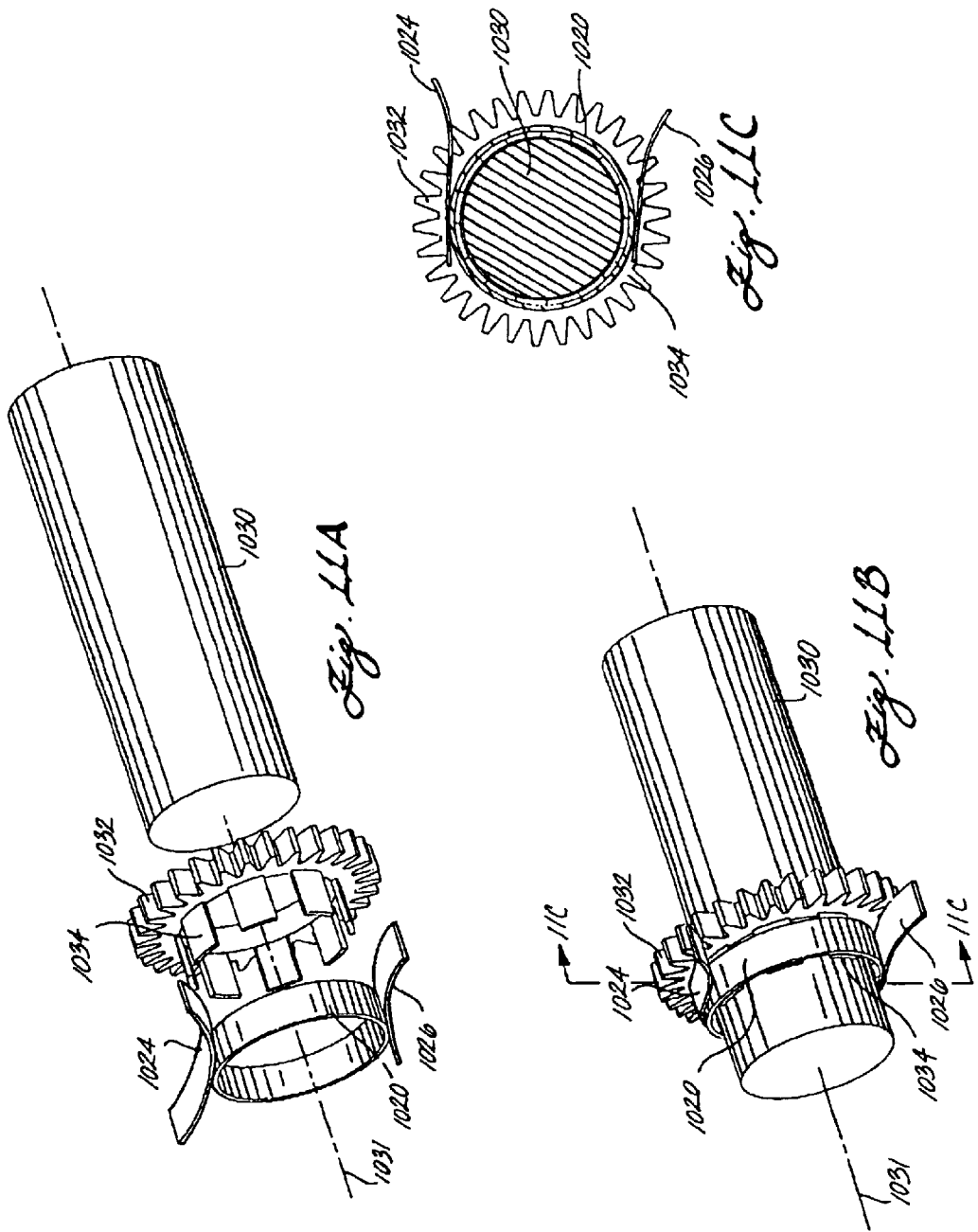

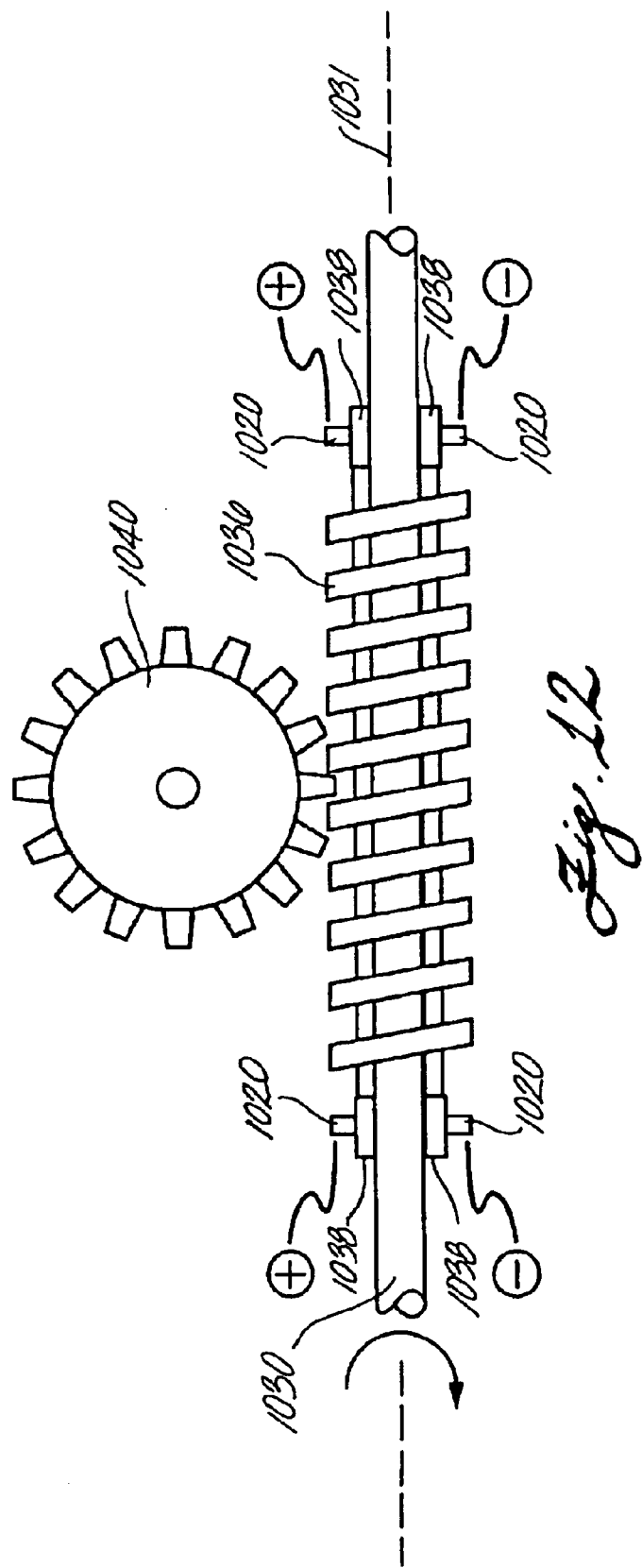

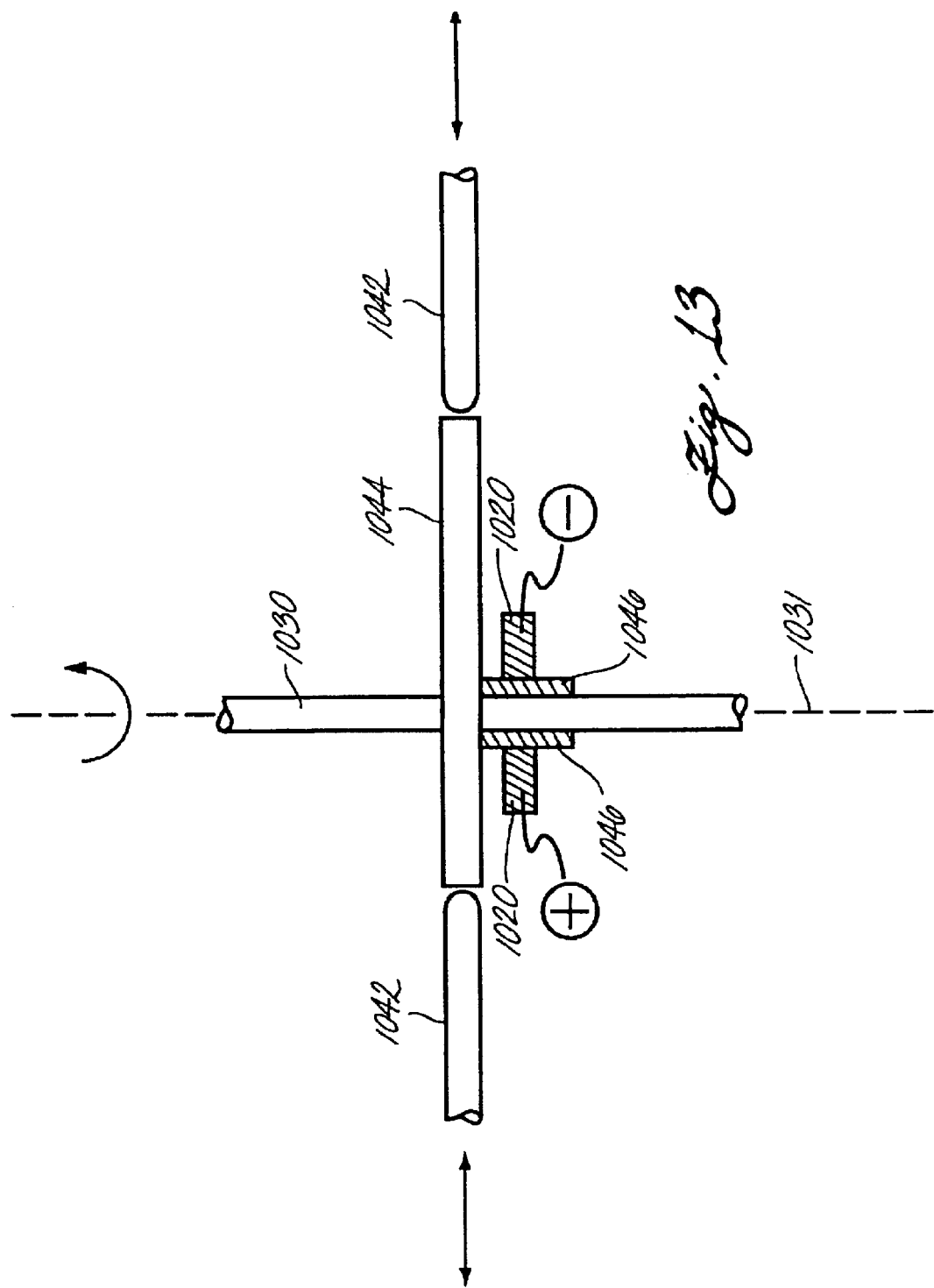

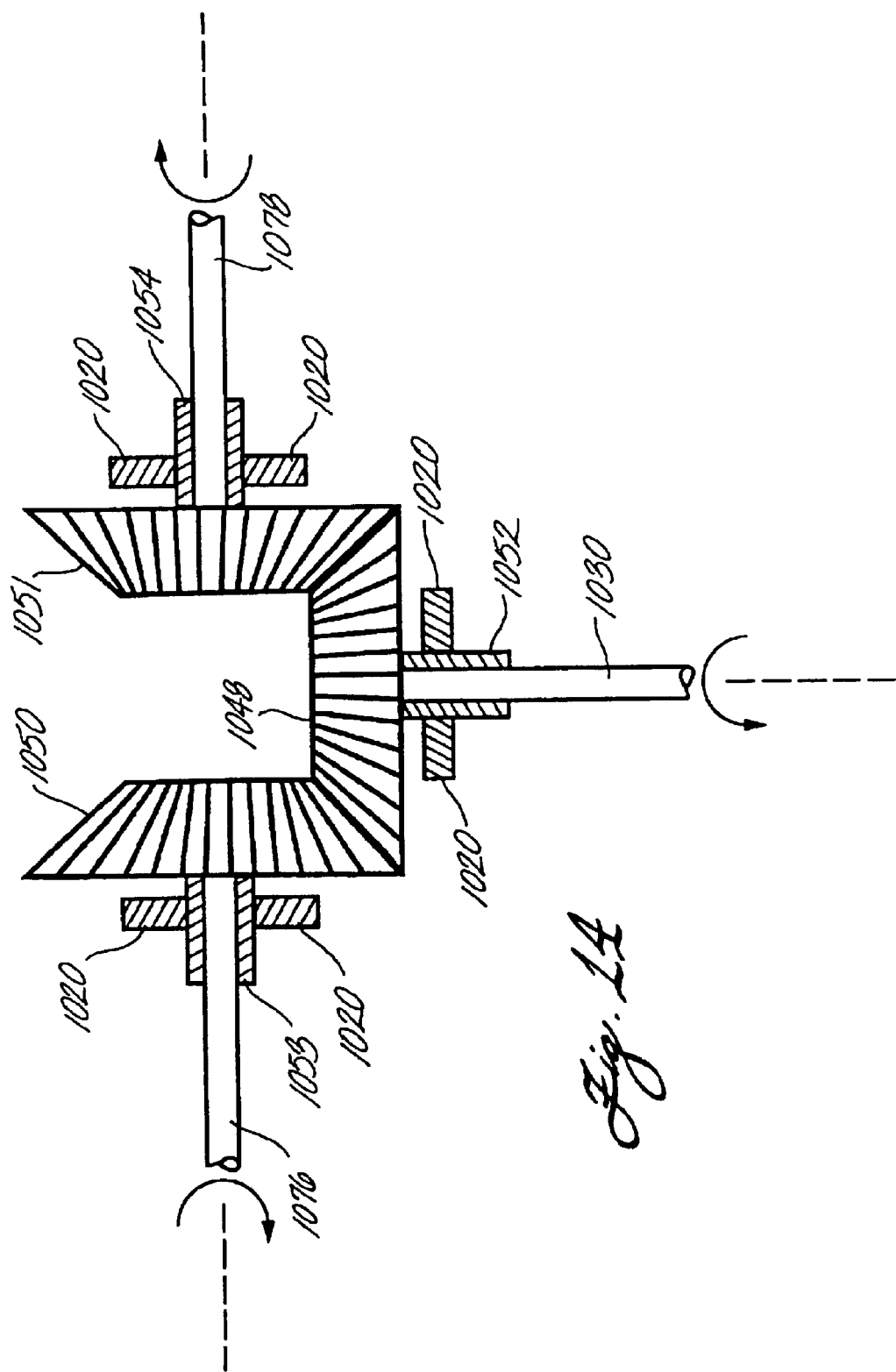

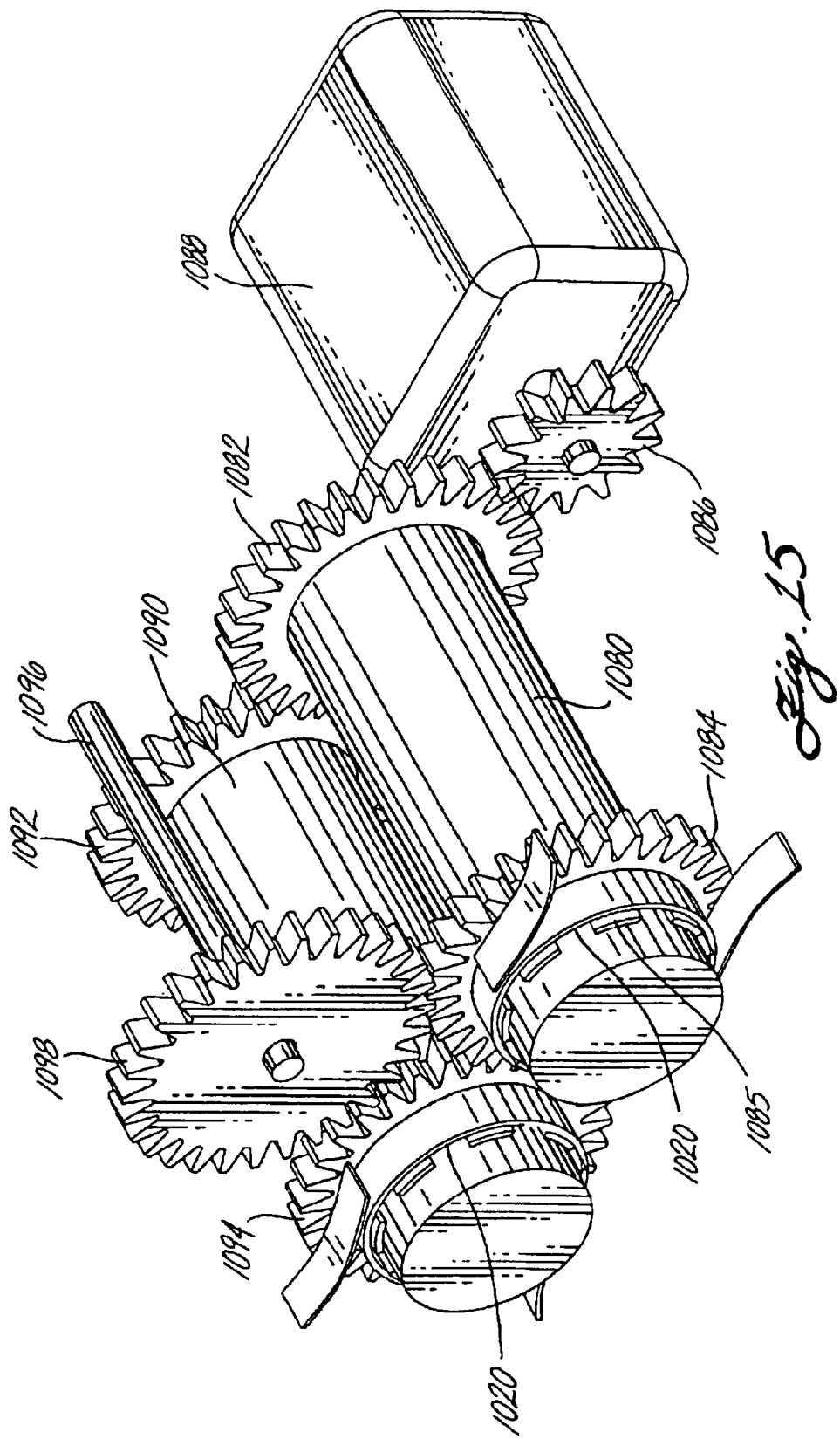

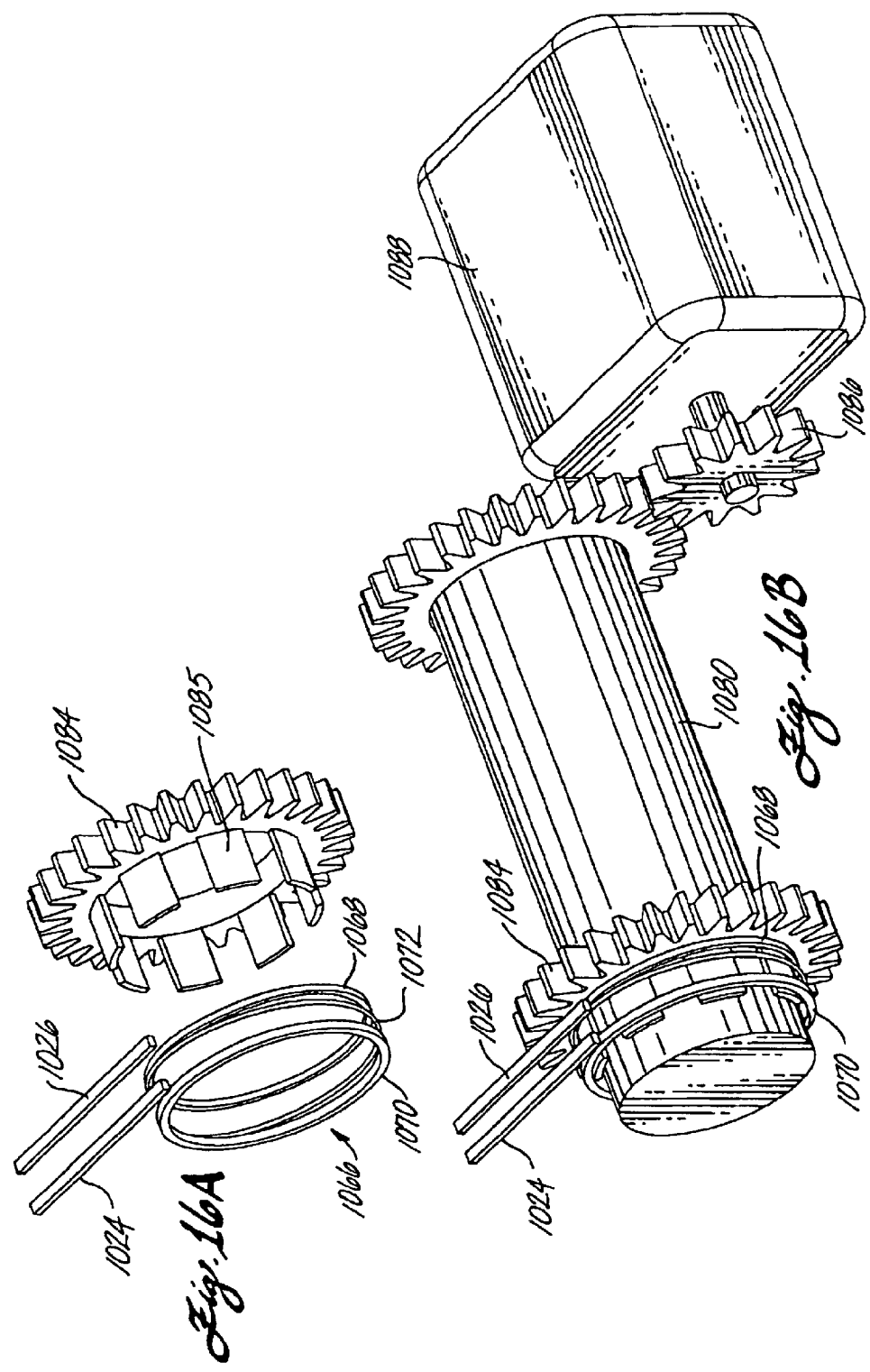

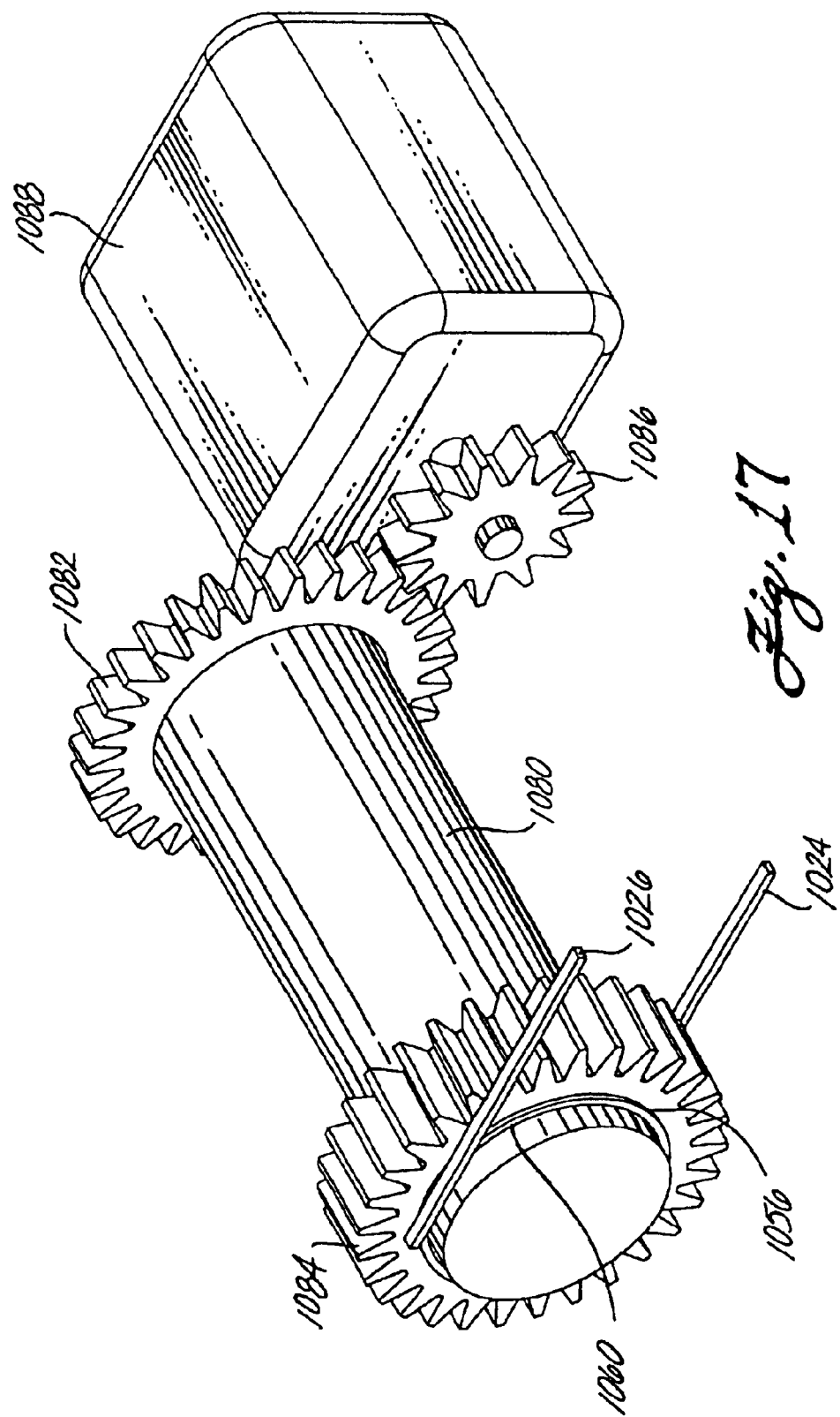

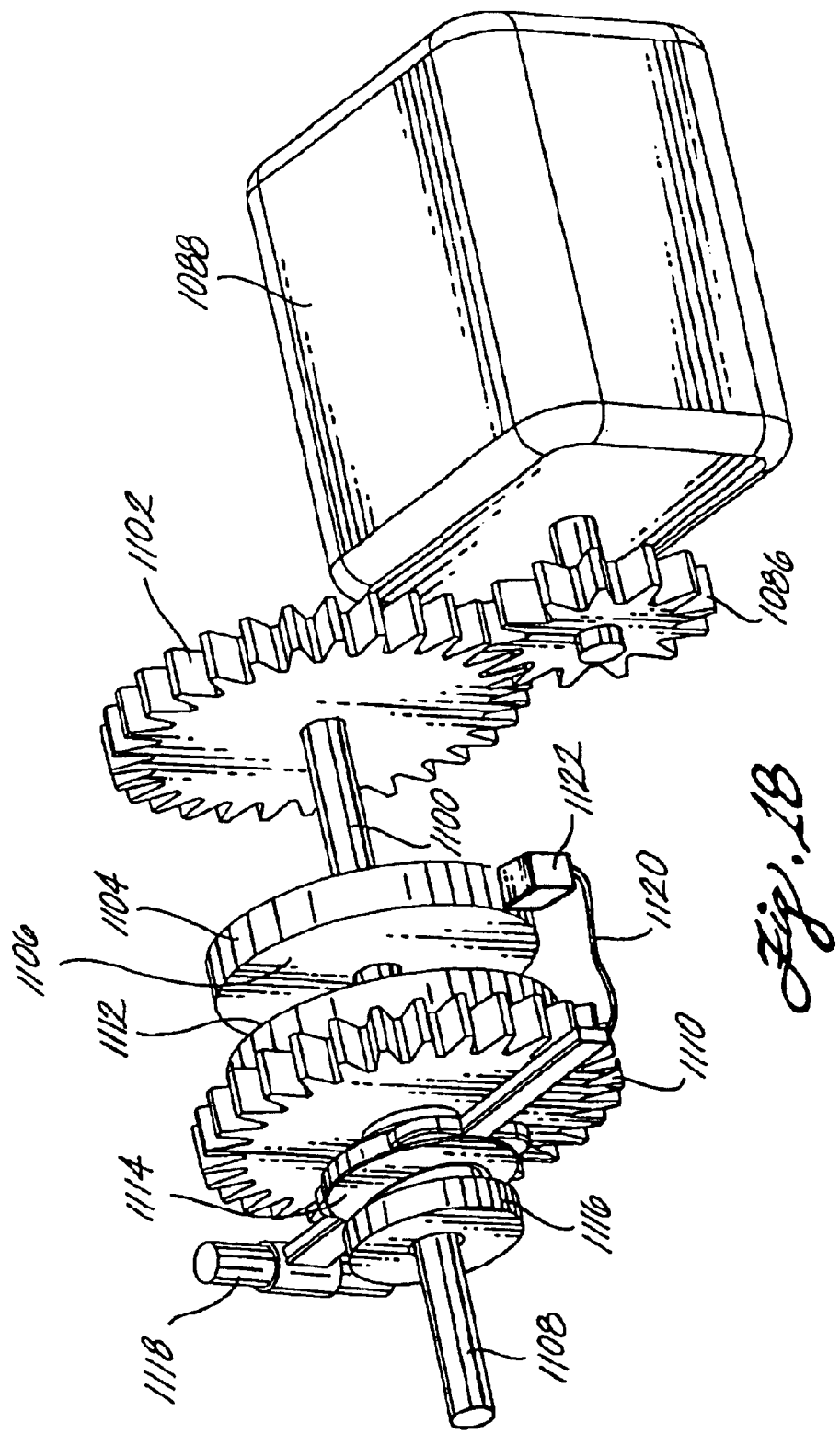

CLUTCH

CROSS-REFERENCE TO RELATED APPLICATION

This application is based upon and claims priority on U.S. Provisional Patent Application Ser. No. 60/129,519, filed on Apr. 14, 1999, which is fully incorporated herein by reference.

FIELD OF THE INVENTION

The present invention relates to clutches using materials that change share upon the application of an electric current or heat, and mechanisms using such clutches for selectively creating multiple power outputs from a single power input.

BACKGROUND INFORMATION

A variety of machines carry out their function using multiple and complex motions. Examples include medical imaging machines such as CAT scanners and MRI machines; industrial machinery such as multiple-axis profilers, lathes, and presses; and robots such as manufacturing robots used to assemble cars and "animatronic" type robots used in the toy and motion picture industries. The complexity of a particular machine depends on the number and complexity of motions it must perform, which in turn depends on the nature of the task the machine must perform.

Robots are now commonly used to perform very complex tasks, and as a result robots are among the most complex machines. A particular robot's design depends on the task it will perform and the constraints imposed on the design. Industrial robots, which are among the most complex, have few or no constraints on weight, space, noise, or power consumption. Other robotic applications such as robotic toys (dolls, etc) have more severe constraints, including cost, space, size, weight, noise and power consumption.

All a robot's movements are driven by actuators such as motors, whether electric, hydraulic, pneumatic, or otherwise. Usually, the number of motors needed increases with the complexity of the motions required of the robot. If the robot must perform a large number of independent movements, then the only way to do this is to have separate, and separately controlled, motors driving each motion. This arrangement has several disadvantages. The large number of motors means higher cost, higher weight, greater space requirements, and greater power consumption. Moreover, each motor has an inherently slow response time because, when activated, it must overcome the inertia of its own components and the inertia of the mechanisms it actuates. Thus, for the robot to have an adequate response time, careful synchronization of motors is necessary. Poor reliability may also be a problem because of the large number of motors and moving parts in the robot.

Today's design trend in robotic toys is to create animated dolls that closely mimic life, which requires the doll to be able to perform many independent movements. For a human robotic doll to truly mimic life, for example, would require independent motion of arms, legs, eyes, facial expression and so on. To date, the only way to create truly independent robotic movements is with one or more motors driving each movement, as is done in industrial robots. Such an arrangement is nearly impossible with robotic toys because of the design constraints mentioned above. For example, with many motors in a small robotic doll it is difficult to insulate all the noise created by the motors. It is also difficult to meet constraints such as power consumption and weight. Toys must also be produced cheaply so that the average consumer can afford to buy one. Often, it is simply impossible to put so many motors inside the limited space available. To date, no robotic doll is capable of more than a small number of truly independent motions.

Various attempts have been made to simulate independent motion in toys. For example, Tiger Electronics has sold a doll under the trademark FURBY that has a number of moving facial features. Each facial feature is coupled to a separate cam driven by an electric motor. The cams create a mechanical program that allows the facial features to move in a predetermined sequence. The movement of the facial features corresponds to an electronically generated speech pattern emitted by the doll.

U.S. Pat. No. 5,158,492 issued to Rudell et al. discloses an animated doll with a number of appendages that move relative to a torso. The appendages are coupled to an electric motor by a plurality of cams and gears. The cams and gears create a mechanical program that defines a sequence of movements for the appendages. The electric motor is actuated by a light beam transmitted by a toy camera. The appendages of the Rudell toy move to a new position each time the user "snaps" the camera to simulate a model poising for pictures.

The movements of the FURBY and Rudell toys are both limited by the mechanical program of the cams and gears. For example, the arms and head of the Rudell toy always move in the same limited sequence. It would be desirable to provide independent movement of the appendages or features to create a more "life-like" toy. The appendages can be de-coupled from each other to provide independent actuation by providing more electric motors. Additional motors increase the cost of producing the toy. The inclusion of additional motors also reduces the reliability of the toy.

Given the design trends and constraints involved in the design of small robotic toys, it is desirable to be able to produce a robot having many independent movements driven by a single motor. More broadly, it is desirable to have the ability to produce and independently control multiple power outputs from a single power input. Multiple power outputs from a single power input are not unknown. Independent control of multiple outputs is possible, but usually uses some form of clutch to engage and disengage the output from the input. Such clutches, however, require a substantial power input to engage and disengage. The power input to the clutch is usually provided by a motor of some sort, thus defeating the purpose of trying to reduce the number of motors in the system. Such an arrangement is smaller, lighter, and cheaper. Even in large robotic systems that are not as constrained, or in other machinery that involves a number of complex movements, a reduction in the number of motors would provide serious cost and space reductions and reliability improvements.

There is thus a need in the art for an apparatus that can minimize the number of motors in a particular machine while still allowing the machine to perform many independent movements so that it can carry out all its functions. For example, there is a need for an animated toy that contains independently actuated features and appendages powered by a single motor. The present invention provides such an apparatus.

SUMMARY OF THE INVENTION

The present invention provides various clutch/gear assemblies that can be driven by a single motor. In other words, the present invention allows for multiple gears or power transmitting surfaces to be driven by a single motor. Each clutch/gear assembly comprise a smart material which changes shape when supplied with energy, e.g., current or heat. The smart material achieves one of a first or a second shape when supplied with energy, and achieves the other shape when it is not supplied with energy. When the smart material achieves a first it causes the clutch of the clutch/gear assembly to engage and be driven by a shaft coupled to the motor and when the smart material achieves a second shape it allows the clutch to disengage from the shaft.

Another embodiment of the present invention includes the incorporation of such clutch/gear assemblies in an animated toy. Each clutch/gear assembly is to a moving part of the toy. Consequently, multiple moving parts of the toy are moved independently using a single motor.

BRIEF DESCRIPTION OF THE DRAWINGS

FIG. 3A is an exploded view of a gear/clutch assembly.

FIG. 5A is an exploded view of a clutch of an alternate embodiment clutch/gear assembly.

FIG. 5B is a plan view of the clutch of shown in FIG. 5A.

FIG. 6 is a plan view of a clutch for an alternate embodiment clutch/gear assembly.

FIG. 8 is an exploded perspective view of an alternate embodiment clutch/gear assembly.

FIG. 9A is an exploded perspective view of an alternate embodiment clutch/gear assembly.

FIG. 9B is perspective view of the clutch/gear assembly shown in FIG. 9A.

FIG. 9C is a partial cross-sectional view of the clutch/gear assembly shown in FIG. 9B.

FIG. 10A is an exploded perspective view of a further embodiment clutch/gear assembly.

FIG. 11A is an exploded perspective view of an alternate embodiment clutch system.

FIG. 11B is a perspective view of the clutch system shown in FIG. 11A.

FIG. 11C is a cross-sectional view taken through line 11C—11C in FIG. 11B.

FIG. 12 is a side view of a further embodiment clutch system.

FIG. 13 is a side plan view of yet a further embodiment clutch system for driving a cam.

FIG. 14 is a side view of a mechanism using multiple clutch systems.

FIG. 15 is a perspective view of a mechanism using the clutch system of FIG. 11A to selectively create forward and reverse motion of an output shaft.

FIG. 16A is a perspective view of a mechanism using alternate an embodiment clutch incorporating a smart material wire coil.

FIG. 16B is an exploded perspective view of the gear and smart material wire coil used by the mechanism shown in FIG. 16A.

FIG. 17 is a perspective view of a further embodiment mechanism.

FIG. 18 is a perspective view of a mechanism using a smart material clutch actuator.

FIG. 24 is a cross-sectional view showing mechanisms for moving the mouth and eyes of a toy doll using the motor and clutch/gear assembly shown in FIG. 23.

DETAILED DESCRIPTION

Figure 1:
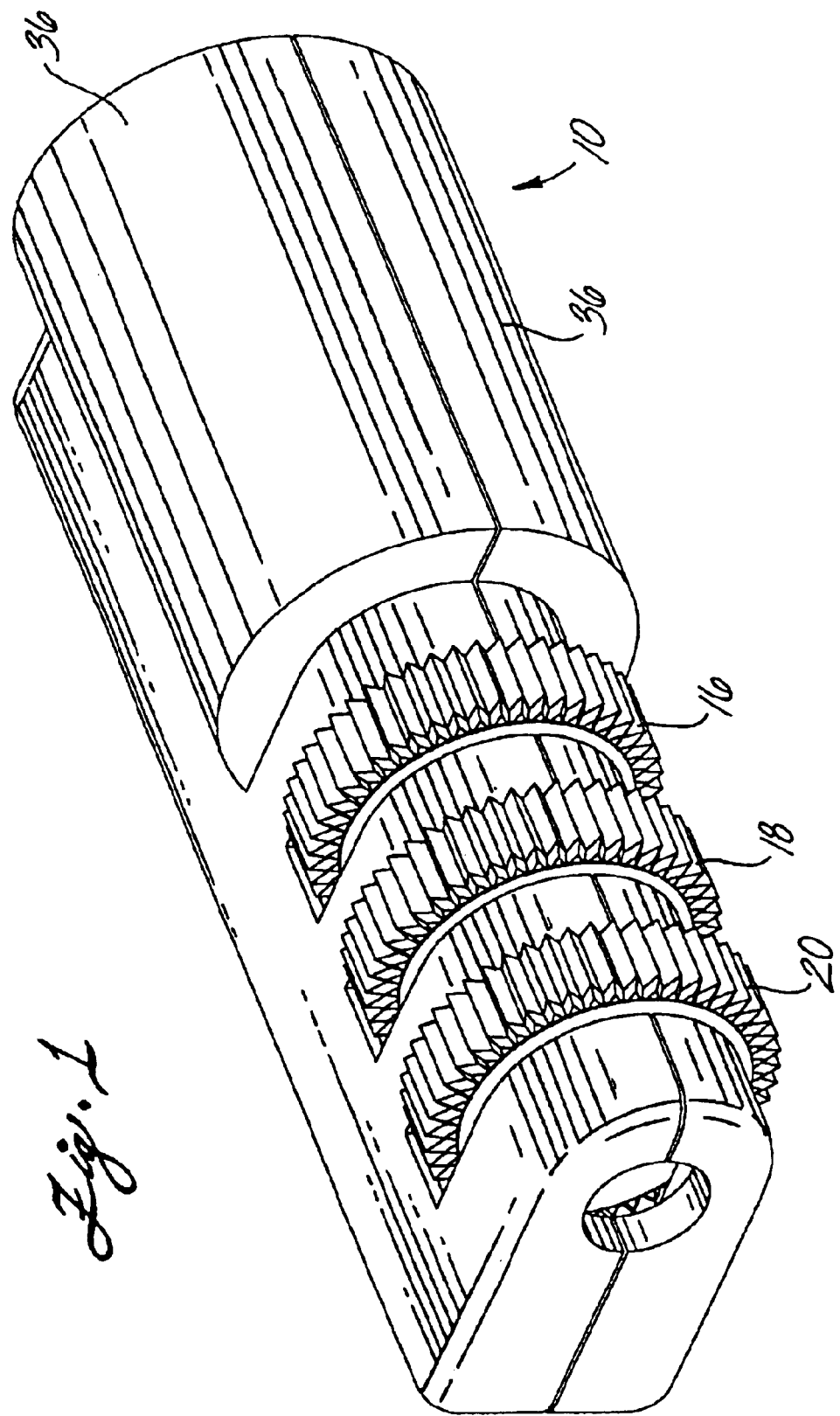
FIG. 1 is a perspective view of a motor and clutch assembly of the present invention.
Figure 2:
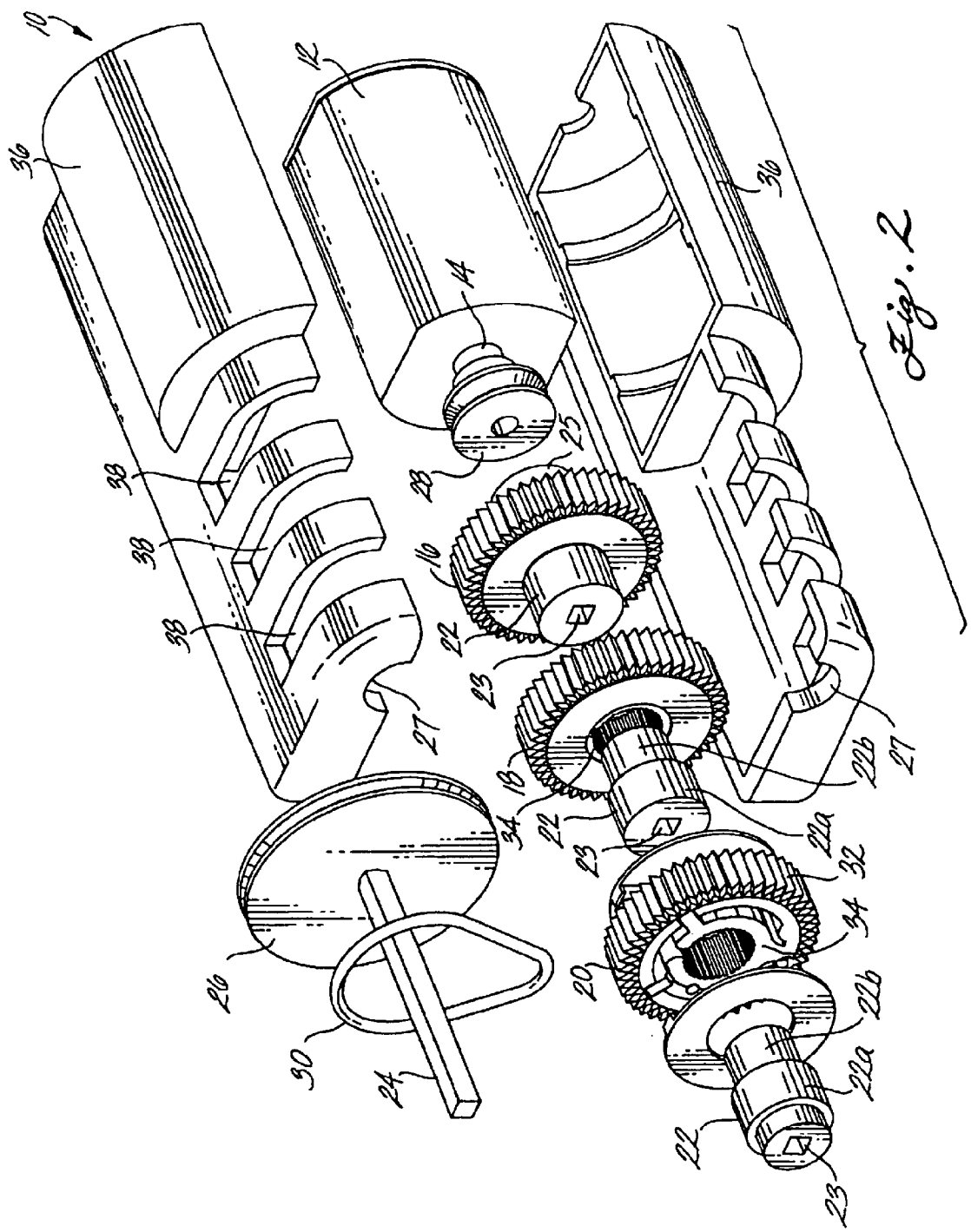
FIG. 2 is an exploded view of the motor and clutch assembly.

Referring to the drawings more particularly by reference numbers, FIGS. 1 and 2 show a motor and clutch assembly 10 of the present invention. The assembly 10 includes a motor 12 that has a rotating output shaft 14. By way of example, the motor 12 may be an electric motor. An output shaft 14 is driven by the motor 12. A first pulley 28 is coupled to the shaft 14. A key or second shaft 24 is coupled to a second pulley 26. A belt 30 is wound around both the first and second pulleys 26, 28. A plurality of gear/clutch assemblies 16, 18 and 20 are mounted on the key by shaft couplers 22 so that they are driven by the key.

Each shaft coupler comprises a larger diameter portion 22a and a smaller diameter portion 22b. The couplers are coaxially mounted to the key 24. To prevent the relative rotation between the shaft couplers and the key, the key preferably has a non-circular cross-section, e.g., a square cross-section as shown in FIG. 2, and the shaft couplers have complementary openings 23, e.g., square to accommodate the key. The shaft couplers are mounted on the key by sliding the key through the openings 23 of the shaft couplers.

The key 14 is attached to a first pulley 26. The second pulley 28 is attached to the output shaft 14 of the motor 12. The diameter of the pulleys 26 and 28 may be such that the gear/clutch assemblies 16, 18 and 20 rotate at a different speed than the output shaft 14.

Each gear/clutch assembly 16, 18 and 20 may have a plurality of gear teeth 32 that are coupled to a corresponding external gear (not shown in FIG. 1 or 2). Each assembly 16, 18 and 20 also has a clutch 34 that can be switched between at least two states, including an engaged state and a disengaged state. In the engaged state the gear teeth 32 rotate with the output shaft 14. In the disengaged state the gear teeth 32 do not rotate with the output shaft 14. The motor 12 is preferably protected by an outer housing 36 that has openings 38 which allow access to the gear teeth 32 of the gear/clutch assemblies 16, 18 and 20.

As shown in FIG. 3A, each clutch 34 comprises an inner clutch ring 42 typically within an outer clutch ring 44. For convenience the inner and outer clutch rings are also referred to herein as "clutch ring plates" or "annular clutch plates". Preferably, the inner and outer clutch rings of each clutch are formed as an integrally molded part. Typically the gear teeth are formed or coupled to the outer surface of the outer clutch ring. The clutch inner ring is in a preferred embodiment only portion of a ring in that it does form a 360° arc. Rather, the inner clutch ring spans an arc greater than 180° and preferably closer to 360° such that it forms a small gap 35 between the ring ends 43.

In the preferred embodiment, the inner clutch ring is connected to the outer clutch ring at a location opposite the gap 35. Otherwise, the inner clutch ring is spaced apart from the outer clutch ring.

An actuator ring 40 wraps around the inner clutch ring plate 42. The actuator ring is made from a "smart material" (also referred to herein as a "shape altering material") that changes shape when exposed to factors such as heat or current. In a preferred embodiment, the actuator ring is formed from a smart material wire. The actuator ring 40 preferably has a pair of termination pads 46. The termination pads are wider than the diameter of the smart wire. Preferably, cavities 47 complementary in shape to the termination pads are formed on opposite surfaces of the outer clutch ring to accommodate the termination pads. Once the termination pads are fitted within their respective cavities, their movement along the plane of the clutch/gear assembly is prevented, i.e., the termination pads are non-rotationally fixed relative to the cavities.

An electrically conductive connector plate 48 is connected on either side of the clutch/gear assembly. When connected to a clutch/gear assembly, each connector plate is in electrical contact with a termination pad 46. Different means may be used to connect a connector plate to a clutch/gear assembly. In a preferred embodiment however, each connector plate is provided with tabs 45 which interlock into complementary cavities 49 formed on either side of the clutch/gear assembly.

The connector plates 48 are electrically coupled to a pair of electrical brushes 54 which are electrically connected to a current and/or voltage source 56. The brushes remain in electrical contact with the connector plates at all times, even when the clutch/gear assembly is rotating, such that electrical voltage and/or current can be provided from the current and/or voltage source to the connector plates and to the actuator ring.

As discussed above, the actuator ring 40 is manufactured from a smart material which changes size, shape, or both in response to application of an electric current or heat. Suitable smart materials include shape memory alloys ("SMAs"), electroceramics (piezoelectric and electrorestrictive materials), and electroactive polymers (EAPs). SMAs are metallic alloys that can "remember" a shape, even alter rather severe deformations. Once deformed at low temperatures, SMAs stay deformed until heated, whereupon they spontaneously return to their original, pre-deformation shape. SMAs may have one way or two way memory. With one-way shape memory, the SMA starts in its deformed shape, recovers its original shape when heated, and retains its original shape when cooled. With two-way shape memory, the SMA also recovers its original shape upon heating, but the SMA returns to its deformed shape when cooled. An SMA having two-way memory is desirable for the actuator ring 40, so that the clutch can be both engaged and disengaged by selectively applying and removing electric current, and therefore heat, to the clutch ting. SMAs that are presently of commercial importance include copper-zinc-aluminum (Cu-Zn-Al), copper-chromium-nickel (Cu-Co-Ni), and nickel-titanium (Ni-Ti, also known as Nitinol). The preferred SMA for the actuator ring 40 is Nitinol.

As an alternate embodiment the actuator ring 40 may be constructed from a smart material such as an electroceramic material such as piezoelectric or electrorestrictive ceramic, that deflects when a voltage is applied to the material. The actuator ring 40 may be constructed from a molded piece of electroceramic material. Alternatively, the electroceramic material may be plated onto a plastic ring or other non-conductive material.

As yet another embodiment the actuator ring 40 can be constructed from a smart material such as an electroactive polymer. Electroactive polymers may contract in response to an electrical current. The electroactive polymer can be molded into the shape of the actuator ring 40. Smart materials such as shape memory alloys, electroceramic and electroactive polymer materials each have different advantages.

Electroactive polymers (EAPs) are polymers that deform upon the application of an electric current and return to their original shape when the current is removed. Under electrical excitation EAPs contract, and thus form a basis for being an actuator. EAPs have the advantage that they can produce large displacements that cannot be matched by the more rigid ceramics. EAPs are lighter, and their potential striction capability can be as high as two orders of magnitude more than electroceramics. Furthermore, the response time of EAPs is significantly lower than the response time of shape-memory alloys SMAs. The main disadvantage of EAPs is that they lack force delivering capability, although they are superior in mass, power consumption and displacement levels. Like the actuator ring 40 made using electroceramics, the actuator ring 40 is made using EAPs by either molding the ring shape out of the chosen EAPS, or by coating a substrate shaped like the ring with the chosen EAPS.

Electroceramics, such as piezoelectric and electro restrictive ceramics, are ceramic materials which also change shape, size, or both upon the application of an electric current and return to their original shape when the current is withdrawn. Electroceramics, however, operate on a different principle than SMAs: an ELECTROCERAMICS's shape changes due to application of the electric current, whereas an SMAs deformation is due not directly to the current, but rather to the temperature increase induced by the current. Electroceramics have somewhat limited displacement capabilities and are more difficult to manufacture than SMAs.

An actuator ring 40 made using an electroceramics can be manufactured by molding the entire clutch ring from the chosen ELECTROCERAMICs material. Alternatively, the actuator ring can be made by layering an electroceramic coating on a metal or plastic substrate, so that when an electric current is applied to the coating it deforms itself and the substrate.

The material chosen for a particular actuator ring 40 depends on the operational characteristics of the material and the use to which the actuator ring will be put. For example, in an application where the actuator ring 40 is required to apply a large load, SMAs and electroceramics are more suitable; in applications where the primary requirement is low power consumption, an EAP may be more suitable. The various operational characteristics of each material is listed in Table I.

TABLE I

| Property | Electroactive polymers (EPA) | Shape memory allows (SMA) | Electroactive Ceramics (EAC) |
|---|---|---|---|
| Actuation displacement | >10% | <8% short fatigue life | 0.1–0.3% |
| Force (MPa) | 0.1–3 | about 700 | 30–40 |
| Reaction speed | $\mu$ sec to sec | sec to min | $\mu$ sec to sec |
| Density | 1–2.5 g/cc | 5–6 g/cc | 6–8 g/cc |
| Drive voltage | 4–7 V | NA | 50–800 V |
| Power consumption | milliwatts | milliwatts | milliwatts |
| Fracture toughness | resilient, elastic | Elastic | fragile |

In a preferred embodiment, the actuator ring 40 is preferably constructed from an SMA that changes shape in response to a change in temperature. The variation in temperature may be created by heat generated from a current flowing through the actuator ring 40. The change in shape of the actuator ring 40 may press the clutch ring 42 into the drive shaft coupler 22 smaller diameter portion 22b and engage the clutch 34 so that the gear teeth 32 rotate in conjunction with the motor 12 shown in FIG. 2. In other words, as current is applied to the actuator ring, the actuator ring contracts while its termination ends are non-rotational fixed relative to the outer clutch ring. Consequently, the contraction of the actuator ring results in the clutch ring applying a radially compressive force on the inner clutch ring, thereby causing the inner surface of the clutch ring to compress against the smaller diameter portion 22b of the shaft coupler such that when the shaft coupler rotates so does the inner and outer clutch rings and the gears. Terminating the flow of current through the actuator ring 40 will eliminate the generation of electrical heat and allow the actuator ring 40 to return to the original position. The clutch 34 is then switched to the disengaged state. When in the disengaged or expanded state the inner diameter of the inner clutch ring is smaller than the outer diameter of the larger diameter section 22a of its corresponding shaft coupler 22.

In order to allow for sufficient compression of the inner clutch ring, the gap 35 should be sufficiently wide such that when the inner clutch ring is compressed by the actuator ring, the inner clutch ring engages the shaft coupler without the ends 43 of the inner clutch ring making contact with each other. If the ends 43 make contact with each other during compression of the inner clutch ring, they may prevent the inner clutch ring from applying a sufficient compressive force on the shaft coupler thereby allowing for unwanted slippage between the gear/clutch assembly and the shaft coupler.

To minimize relative rotational slippage between the inner and outer clutch rings 42, 44, the inner clutch ring may be formed with one or more, and preferably two tabs 51 which extend radially outward from the inner clutch ring 42. The outer clutch ring is formed with slots 53 to accommodate the tabs 51 without preventing the inner clutch ring from fully extending. When the inner clutch ring is fully compressed over a shaft coupler, at least a portion of each of the tabs is still within its corresponding slot in the outer clutch ring. In this regard, when the inner clutch ring is caused to rotate by the shaft coupler, the tabs engage the side walls 55 of the slots and prevent the relative rotation between the inner and outer clutch rings. To allow the actuator ring 40 to wrap around the outer surface of the inner clutch ring, a groove 57 following the contour of the outer surface of the inner clutch ring is formed across each of the tabs 51.

Figure 3B:
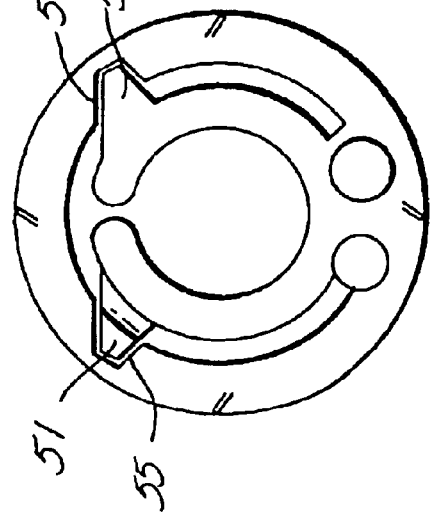
FIG. 3B is a plan view of the clutch rings of a clutch assembly.
Figure 3C:
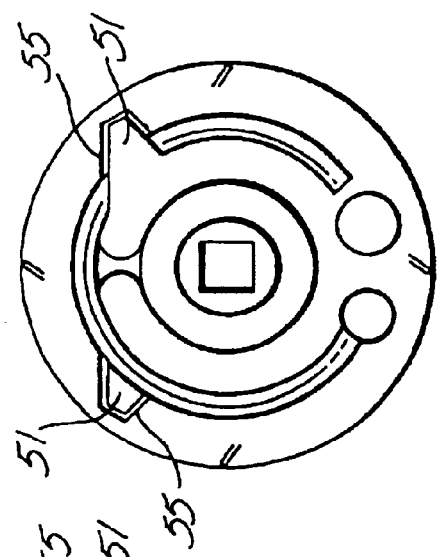
FIG. 3C is a plan view of the clutch rings of FIG. 3B including an actuator ring.
Figure 4:
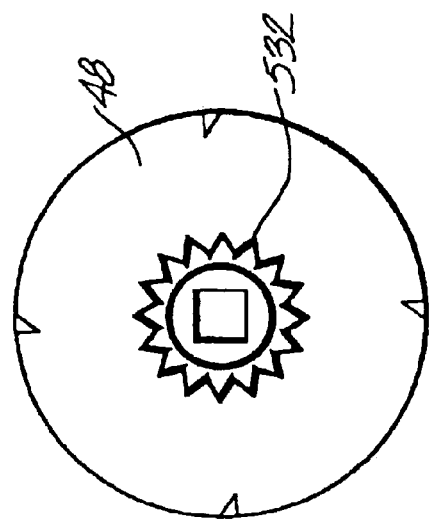
FIG. 4 is a plan view of a clutch/gear assembly having a gear extending from a connector plate.

An alternate design clutch/gear assembly is shown in FIGS. 3B and 3C. FIG. 4. depicts an alternate embodiment clutch/gear assembly including the connector plates 48. With this embodiment, the geared surface 532 extends from the connector plate and is not formed over that outer clutch ring. This embodiment allows for a smaller diameter gear to be coupled to the motor. In a further alternate embodiment (not shown) a geared surface may be formed over the outer clutch ring and a geared surface may be formed extending from the connector plate such that a single clutch/gear assembly can simultaneously drive two different diameter gears.

In a further alternate embodiment, any of the aforementioned clutch/gear embodiments may comprise an inner clutch ring that is not connected to the outer clutch ring. Rather, the inner clutch ring is formed with tabs, as for example tabs 51 shown in FIGS. 3, 4A and 4B, which are fitted within slots formed on the outer clutch ring.

A yet further embodiment clutch/gear assembly 500 is shown in FIGS. 5A and 5B. With this embodiment, the inner clutch ring 502 is a complete ring and is separate from the outer clutch ring 504. Three tabs 506a, 506b and 506c extend from the outer surface 508 of the inner clutch ring. Preferably, the three tabs are equidistantly spaced around the outer surface of the inner clutch ring. The tabs 506a, 506b, and 506c fit within corresponding slots 509a, 509b and 509c formed on the outer clutch ring 504. One tab 506c has openings 510 for accommodating and holding the actuator ring 40 termination pads 512. A groove 514 is formed across each of the other two tabs 506a and 506b to accommodate the actuator ring 40. Each groove 514 follows the contour and is formed immediately adjacent to the outer surface of the inner clutch ring.

To allow for compressing of the inner clutch ring over the shaft coupler or shaft, a portion 516 of the inner clutch ring is thinned out. In a preferred embodiment, the thinned portion of the inner clutch ring defines a curved member 518 extending relative to the inner clutch ring such that as the inner clutch ring attempts to compress it applies a load at either end 520 of the curved member causing the curved member to collapse and thereby facilitating the compression of the inner clutch ring. Strain reliefs 522 are formed on the inner clutch ring extending from the outer surface of the inner clutch ring and extending toward the inner surface of the inner clutch ring. The strain reliefs are slots which weaken the inner clutch ring promoting the bending of the ring at the slot as the ring is being compressed causing the slot to laterally expand or compress. Strain relief slots 524 are also preferably formed extending from either side of the outer surface of the curved member 518 to allow for flexing of the curved member while being collapsed under pressure. To provide for better gripping of the shaft or shaft coupler, the inner clutch has linear grooves 526 formed longitudinally across the inner surface defining longitudinal ridges 528 between adjacent grooves.

Instead of the inner clutch ring 502 shown in FIG. 5A, an alternate embodiment inner clutch ring 529 may used with the clutch/gear assembly. This alternate embodiment inner clutch ring comprises three sections 530a, 530b, and 530c which are interconnected by thin curved members 534 which extend from adjacent of the outer surfaces 508 of said sections as shown in FIG. 6. Preferably, the three sections and curved members are integrally formed as a single piece.

The ends 536 of each inner clutch ring section are angled from the outer surface 508 toward the inner surface 538 of each section such that the outer surface of each section extends beyond the inner surface at either end of the section. In this regard the outer surface of each section spans a larger arc than the inner surface of such section. Consequently, a V-shaped gap 540 is defined between the ends 536 of consecutive sections and their corresponding curved member 534. In this regard when the clutch inner ring plate is compressed the consecutive sections can rotate a greater angle toward each other before their ends 536 meet. As a result, the clutch inner ring can compress more and apply a greater force against a shaft or shaft coupler. To further assist the in the compression of the clutch inner ring strain relief slots 522 are also formed on the outer surfaces of the sections.

In alternate embodiments, one of the tabs, as for example tab 506c shown in FIGS. 5A and 6, may be fixed or be integrally formed with the clutch outer ring 504. Moreover each of the aforementioned clutch inner rings may include more or less than three tabs 506 and similarly their corresponding clutch outer rings may have more or less than three slots 509 to accommodate the tabs.

The actuator ring termination pads may be buttons of any geometry, as for example round termination pads 46 shown in FIG. 3 or may be elbow shaped as for example the termination pads 512 shown in FIG. 5A. Typically, the elbow shaped pads consist of a first member 512a from which extends perpendicularly a second member 512b defining the elbow. Where as cavities 47 are sufficient for accommodating the button style termination pads 46, the openings 510 for accommodating the elbow shaped termination pads 512 must penetrate the entire thickness of the clutch inner ring plate. To connect to the hole 510 the second member 512b of the elbow shaped termination pad 512 is fitted through the hole 510. The elbow shape termination pad is then rotate causing the second member 512b to exit the hole 510 from the other side of the clutch inner ring and the first member 512a to enter the hole 510. In this regard, the second member 512b anchors the elbow shaped termination pad to the clutch inner ring plate as shown in FIG. 5B. Preferably, one termination pad is mounted from one side of the clutch inner ring and the other termination pad is mounted from the other side of the clutch inner ring.

Figure 7:
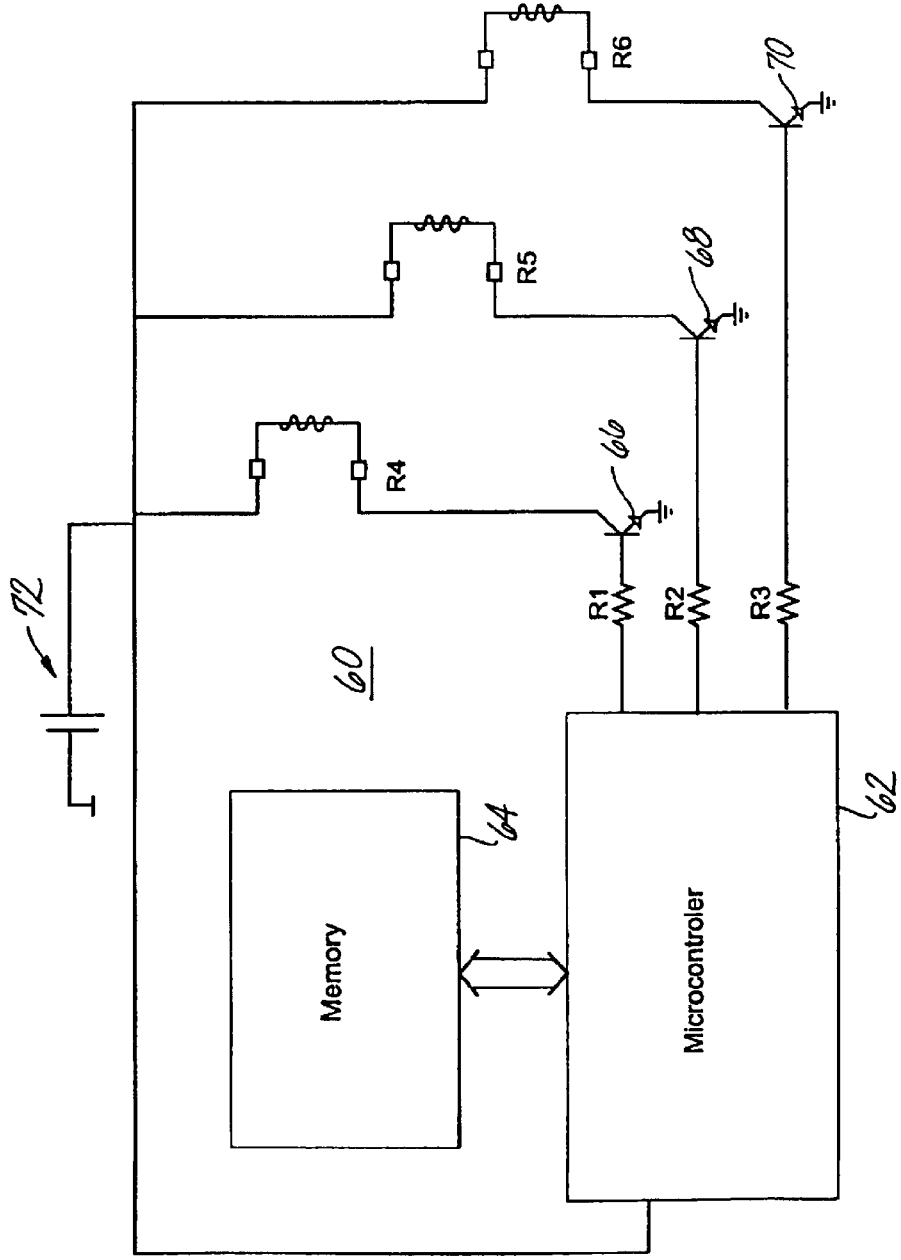
FIG. 7 is a schematic of an electrical control system.

FIG. 7 shows a schematic of an electrical system 60 that can control a motor and clutch assembly. The system 60 may include a microcontroller 62 that can perform in a software routine(s) in accordance with instructions and data. The microcontroller 62 may be connected to a memory device(s) 64. The memory device 64 may be read only memory (ROM) that contains instructions for performing the software routine. The system 60 may also contain volatile memory such as dynamic random access memory (DRAM).

The microcontroller 62 can be connected to a plurality of transistors 66, 68 and 70 through base resistors R1, R2 and R3, respectively. The transistors 66, 68 and 70 are connected to the actuator rings of gear/clutch assemblies 16, 18 and 20, depicted as R4, R5 and R6, respectively. The microcontroller 62, memory device 64 and transistors 66, 68 and 70 can all be connected to a battery(ies) 72.

The microcontroller 62 can bias the transistors 66, 68 and 70 so that a current flows through resistor/actuator rings R4, R5 and R6, respectively. The current will cause the resistor/actuator rings R4, R5 and R6 to change shape and switch the clutch into the engaged state. The microcontroller 62 can independently bias the transistors 66, 68 and 70 to selectively engage and disengage the gear/clutch assemblies 16, 18 and 20 in accordance with the software routine. For example, the microcontroller 62 can bias transistors 66 and 70 to engage gear/clutch assemblies 16 and 20, resistors R4 and R6, respectively, and 20 while gear/clutch assembly 18, resistor R5, is disengaged.

The system 60 shown may be desirable when using a shape memory alloy or an electroactive polymer as the actuator ring material. When using an electroceramic material the transistor configuration may include a resistor between the transistor emitter and ground. The electroceramic may be connected in parallel with the emitter resistor. Biasing the transistor will cause a current to flow through the emitter resistor. The current will create a voltage potential across the emitter resistor and the electroceramic actuator ring.

To assemble the clutch system, the belt 30 is used to couple the first pulley 28 to the second pulley 26. A spacer 25 may be fitted around the key 24. The first gear/clutch assembly 16 with connected connector plates is then fitted over the key. A first shaft coupler is the fitted over the key with its smaller diameter portion first. The smaller diameter portions slides within the inner opening defined by the inner clutch ring of the first gear/clutch assembly 16. The second clutch/gear assembly 18 with attached connector plates is then slid over the key followed by a second shaft coupler whose smaller diameter section 22b is fitted under the inner clutch ring of the second clutch/gear. The third clutch/gear assembly 0.20 including connector plates is slid over the key followed by a final shaft coupler 22 whose smaller diameter section 22b is slid under the inner clutch ring of the third clutch/gear. The final shaft coupler preferably has a third diameter section 22c which is spaced apart from the smaller diameter section 22b by the larger diameter section 22a. The entire assembly is then housed in the housing 36 with the gears protruding through the housing openings 38. When in the housing 36, the third diameter section 22c of the third shaft coupler rides within a bearing surface 27 defined in the housing edge walls, while the larger diameter section 22a remains within the housing. The bearing surface has a diameter that is slightly larger than the diameter of the third section 22c but smaller than the diameter of the shaft coupling larger diameter section 22a. As can be seen, the larger diameter sections 22a of the shaft couplers serve as spacers between clutch/gear assemblies.

Although the a clutch system has been described herein using three gear/clutch assemblies, more or less than three clutch/gear assemblies may be driven by a single motor and/or key or shaft. In an alternate embodiment, the clutch/gear assemblies may be mounted directly on a shaft extending from the motor. With this embodiment, the inner clutch ring of a clutch/gear assembly will be made to engage the outer surface of the shaft when in an engaged state. Spacers may be used for separating the various clutch/gear assemblies.

A further alternate embodiment clutch/gear assembly 600 is shown in FIG. 8. The clutch/gear assembly 600 comprises two opposing clutch members 602 and 604. Each clutch member has a concave inner surface and preferably a semicircular inner surface as for example inner surface 606, 608. When the two members are brought together, the inner surfaces define a circle or ellipse having a diameter that is smaller than the outer surface diameter of the shaft or shaft coupler.

A channel 610 is defined opposite the inner surface of the first member. Similarly a channel 612 is defined opposite the inner surface of the second member. Each member is slidably coupled in opposing relationship—such that the inner surface of one member faces the inner surface of the other member—on a connector plate 618. A second connector plate 620 is mounted opposite the first connector plate sandwiching the two clutch members between the two connector plates. Each of the clutch members preferably has an integrally formed pin 622 extending from opposite sides of each member and transversely to the connector plates. Each connector plates has two oval openings 624 to accommodate each pin 622. The pins 622 protrude through the openings 624 and are cold or heat staked causing the portions pins protruding through the openings 622 to expand and thereby latch on to the connector plates without being fixed to the connector plates. In this regard the pins can slide within their corresponding oval openings, thereby allowing the members to slide relative to the connector plates.

Central openings 626 and 628 are formed respectively in the first and second connector plates 618 and 620. The clutch members when slid toward each other define an opening coaxial with the opening of the connector plates. A gear 628 extends laterally from the second connector plate in surrounding relationship to the connector plate opening 628. The gear/clutch assembly is fitted over a shaft or shaft coupler (not shown in FIG. 7) such that the shaft or shaft coupler penetrates the connector plate openings 626 and 628.

A smart material actuator wire 614a having termination pads 616 is fitted through the channel a member. One of the termination pads is coupled to one connector plate while the other termination pad is connected to the other connector plate. The actuator wire 614 serves the same function as the actuator ring described in relation with the previous embodiments. The actuator wire may constructed from any of the smart materials described above such that it can change or resume its shape based on the application and withdrawal of heat or current. Similarly, a second actuator wire 614b is fitted through the channel of the second connector member and has its first termination pad coupled to the first connector plate and the second termination pad coupled to the second connector plate.

As the actuator wires change shape as they receive current via the connector plates, they cause their corresponding clutch member to slide toward the other member and clamp against the shaft or shaft coupler. In an alternate embodiment, one of the clutch members is fixed to plate and only the other clutch member is allowed to slide for engaging the shaft or shaft coupler. It should be understood that the term wire as used herein should be interpreted to include wires, strips and other forms of elongated material structures such as tubes, molded forms, extruded forms and stamped forms.

A yet further embodiment clutch/gear assembly 650 is shown in FIGS. 9A and 9B. This embodiment clutch gear/assembly comprises a clutch drum 652 which interfaces with a shaft coupler 654. The shaft coupler has a larger diameter section 656 from which extends a smaller diameter section 658 which is coaxial with the larger diameter section.

The clutch drum comprises a round base plate 660. A plurality of tines 662 extend transversely from the round plate edge. The tines preferably extend around the entire circumference of the base plate. The inner surfaces 663 of the tines define a sectioned circular surface that has a diameter slightly larger than the diameter of the shaft coupler larger section 656.

In the embodiment shown in FIGS. 8A and 8B, a gear 664 extends coaxially from the base plate in a direction opposite of the tines. A central opening 666 if formed through the thickness of the base plate and axially through the gear to accommodate the shaft coupler smaller diameter section 658. Preferably, the entire clutch plate, i.e., the base plate, tines and gear are integrally formed by molding. The tines may be formed directly by molding or in the alternative may be formed by forming a solid band extending laterally from the base plate and by cutting slots 670 axially across the band to define the tines. Preferably, the clutch drum is formed from a plastic material.

To form, the clutch/gear assembly 650, the shaft coupler 654 is fitted within the clutch drum 652 such that the smaller diameter section 658 of the shaft coupler 654 penetrates the opening 666 of the clutch drum while the larger diameter section 656 is surrounded by the tines 662. In a preferred embodiment, the tines extend from the base plate at an angle greater than $_{90}$° as shown in FIG. 9C such that a gap 672 defined between the outer surface of the shaft coupler larger diameter section 656 and the inner surface 663 of the tines increases in width in a direction away from the base plate660 of the clutch plate. This provides for some travel by the tines prior to engaging the shaft coupler larger diameter section outer surface. A actuator wire 674 such as the actuator wire described above is wrapped once over the tines. To accommodate the actuator wire and to prevent slippage of the wire from the outer surfaces 676 of the tines stops 677 extend radially outward from the tines. These stops are staggered in that some extend from proximate the free end of the tines while some extend from a location closer to the base plate. In this regard, a path is defined between the stops for the actuator wires while the stops maintain the actuator wire over the tines. In an alternate embodiment (not shown) instead of stops, a circumferential groove is formed on the outer surface of the tines to accommodate the actuator wire.

A pair of connector plates are fitted over the clutch plate. A first connector plate 678 having a central opening 680 to accommodate the gear 664 and is fitted against the base plate with the gear protruding through the opening 680. A second connector plate 682 having a central opening 684 to accommodate a shaft (not shown) coupled to a motor (also not shown) is mated to the other side of the clutch plate 652 such that the clutch plate 652 with shaft coupler 654 is sandwiched between the two connector plates 678, 682. The ends of the actuator wire 674 are coupled to the connector plates, i.e., one end is coupled to each connector plate. Transverse slots 692 are formed across some of the stops 677 to provide a path for the actuator wire to the clutch plates.

Staking pins 686 extend from the base plate 660 as well as from some of the ends 688 of the tines 662 as shown in FIGS. 9A, 9B and 9C. Preferably two tines extending from opposite points on the base plate are longer than the remaining tines. Preferably the staking pins extend from the ends of the longer tines. The connector plates 678 and 682 have oval holes 690 to accommodate the staking pins. When the connector plates are mated to the clutch plate, the staking pins 686 penetrate through the holes 690. The staking pins are then heat or cold staked causing the portions of the staking pins protruding through the holes to melt and expand to a diameter greater than the diameter of the holes 690, thereby staking the connector plates to the clutch plate while allowing for slidable movement of the pins within the oval holes 690.

In a preferred embodiment, the actuator wire 674 is connected to both connector plates 678, 682 prior to the mating of the connector plates to the clutch plate. The connector plates with attached wire are mated to the clutch plate and rotated (i.e., twisted) relative to each other causing the actuator wire to wrap over the tines. The connector plates are then stake to the clutch drum. Furthermore, in another embodiment, the gear 664 may be made to extend from one of the connector plates instead of the clutch plate.

When current is applied to the connector plates it is conducted by the actuator wire which in turn tightens around the tines causing the tines to bend and flex and thereby engage the larger diameter section of the shaft coupler and thereby causing the clutch plate with the connector plates and gear to rotate along with the shaft coupler. When the current is relieved, the actuator wire returns to its original position allowing the tines to expand to their original position and disengage from the shaft coupler larger diameter section. Consequently, the shaft coupler is thus able to rotate without imparting a rotating force on the clutch plate, connector plates and gear.

While two tines may be sufficient for this embodiment, more than two tines are preferred. In an alternate embodiment, instead of tines a flexible band may formed extending laterally from the base plate which can be made to flex and engage the shaft coupler larger diameter section by the actuator wire. When wrapping the actuator wire around the tines, care must be taken not to wrap the wire to tightly so as to not cause the tines to be in: continuous engagement with the shaft coupler larger diameter section outer surface.

In yet a further embodiment, the tines, or the entire clutch drum 652 with the exception of the gear, are made from a smart material such as a shape memory alloy, electroceramic or other electroactive polymer material that changes shape in response to an electrical signal. Alternatively, the tines may be made to include a smart material. A wire coupled to the connector plates directs current to the clutch plate or tines 662 which causes the tines to engage the outer surface of the shaft coupler larger diameter section. When the current is relieved, the tines return to their original non-engaging position.

Figure 10B:
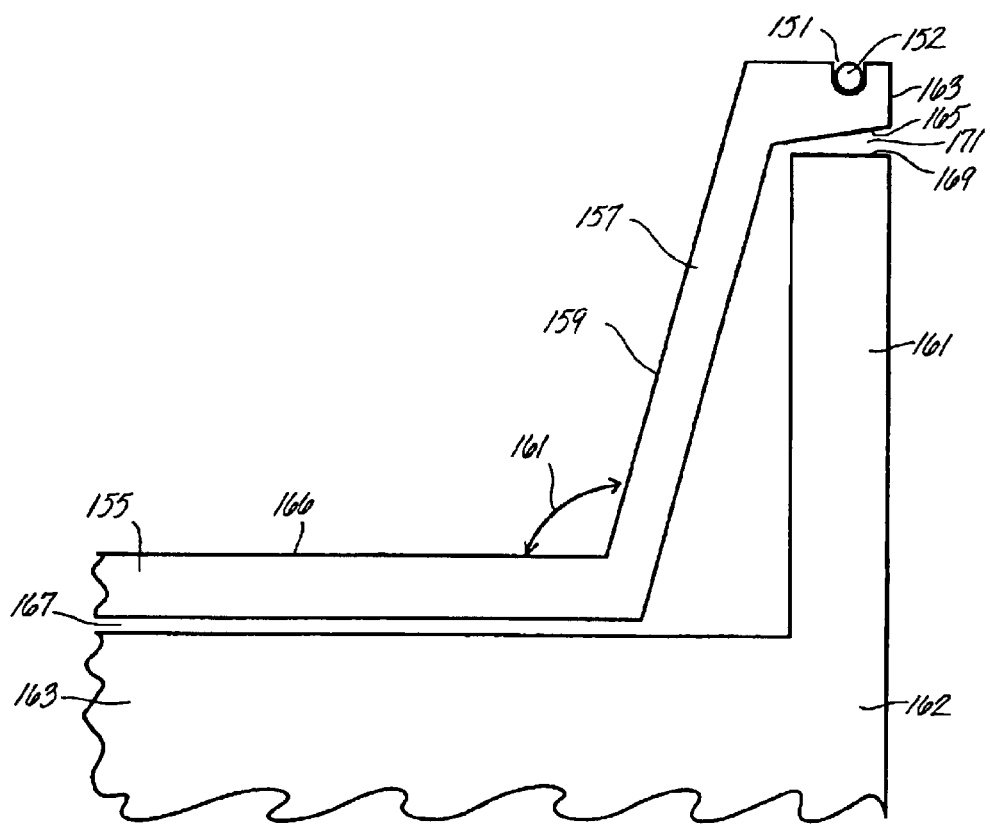
FIG. 10B is a partial cross-sectional view of the clutch/gear assembly shown in FIG. 10A.

FIGS. 10A and 10B disclose an alternate embodiment of a gear/clutch assembly 150. The assembly 150 comprises an actuator ring 152 that extends around a clutch drum 154. The actuator ring 152 is constructed from a smart material such as a shape memory alloy, electroceramic or other electroactive polymer. This clutch/gear assembly interfaces with a shaft coupler 162 having a larger diameter section 161 and a smaller diameter section 163 extending coaxially from the larger diameter section.

The actuator ring 152 has a pair of termination pads 156, each being in contact with a connector rings 158. The connector rings 158 are preferably constructed from an electrically conductive material. The connector rings 158 are in electrical contact with a pair of brushes 160 that are connected to a current/voltage source (not shown). The current and/or voltage is applied to the actuator ring 152 through the brushes 160 and rings 158.

The clutch drum includes a gear 155 having gear teeth 166 and a plurality of tines 157 extending from an end of the gear in a radially outward direction such that the smallest angle 161 between an outer surface 159 of the tines and the gear teeth 166 is greater than 90° but less 180°. The gear 155 has a central opening 167 to accommodate the smaller diameter section 163 of the shaft coupler.

A bearing portion 163 extends from an end of each tine. The shaft coupler smaller diameter section is mates within the opening 167 of the gear such that bearing portions extend over the larger diameter section 161 of the shaft coupler. The inner surface 165 of the bearing portions may be parallel to the outer surface 169 of the shaft coupler larger diameter portion 161 but preferably, the bearing portion inner surface 165 is inclined at small angle relative to the shaft coupler outer surface 169 forming a gap 171 having a width that increase in a direction away from the gear 155 (FIG. 10B).

A groove 151 is formed on the outer surface of each bearing portion transversely to the length of the tine to accommodate the smart ring 152. A cover plate having an opening 168 and an annular wall 700 is fitted over the clutch plate 152 such that the clutch plate gear 155 is fitted through the opening 168 and the cover plate annular wall 700 surrounds the tines and their corresponding bearing portions. To ensure that the cover plate rotates with the clutch plate gear teeth 702 are formed on the peripheral wall of the opening 168. The gear teeth 702 mesh with the gear teeth 166 of the gear 155. Two slots 704 are formed extending to the free end 706 of the annular wall 700 to accommodate the terminating pads 156 when the cover is fitted over the clutch plate. The pads 156 may be separated by a dielectric pin (not shown) to prevent the creation of an electrical short in the system. The cover plate is formed from a non-conductive material.

The connector rings are then mounted on either side of the mated clutch plate and cover plate sandwiching the cover plate and clutch plate forming the clutch/gear assembly 150. A dielectric material ring (not shown) may be placed between the connector rings to isolate them from each other. When mounted, the connector rings are in contact with the termination pads 156. The clutch/gear assembly 150 is then mated with the shaft coupler 162.

The actuator ring 152 contracts when a voltage and/or current is applied to the ring 152. The contraction of the ring 152 applies a force over the bearing portions of the tines causing the tines to flex and the bearing portions to press against the outer surface 169 of the larger diameter section 161 of the shaft coupler thereby causing the clutch/gear assembly to rotate as the shaft coupler is rotating.

In yet a further embodiment, tines 157, or the entire clutch drum 152 with the exception of the gear 155 are made from a smart material such as a shape memory alloy, electroceramic or other electroactive polymer. Alternatively, a smart material is incorporated in the tines. A wires coupled to the connector rings direct current to the clutch drum 152 or tines 157 causing the tines to engage the outer surface of the shaft coupler larger diameter section. When the current is relieved, the tines return to their original non-engaging position.

With any of the aforementioned embodiments by controlling the amount of current or heat applied or generated by the shape memory alloy the amount of force with which the clutch plate or ring engages a shaft or shaft coupler coupled to a motor may be controlled. In this regard, the rotational speed of the gears coupled to the clutch drum or ring may be controlled. For example, by applying a lesser force some slippage may occur between the clutch drum or ring and the shaft or shaft coupler thereby reducing the rotational speed of the gear in relation to the rotational speed of the shaft or shaft coupler. Moreover, because the engagement between the clutch plate or ring and the shaft or shaft coupler is a frictional one, a relief mechanism is provide which would allow the gear to slip relative to the shaft or shaft coupler when a force of some magnitude is applied to the gear thereby preventing damage to the gear or motor that would otherwise occur.

FIGS. 11A, 11B and 11C together illustrate a mechanism using a clutch ring 1020 to transmit power from a first, powered rotating shaft 1030 to a second, unpowered shaft (not shown). The clutch ring is made from a smart material such as a shape memory alloy, electroceramic or other electroactive polymer material. With this embodiment, the clutch ring is also the actuator.

The clutch ring 1020 is preferably manufactured such that it is in an expanded state at low temperature and contracts upon heating. If the clutch ring 1020 is manufactured using an SMA, the clutch ring can be simply made by cutting pieces of length from the ends of an SMA pipe of the correct inner diameter. Alternatively, the ring could be formed from a strip of the SMA by forming the strip into an annular shape and welding it together along a seam. The clutch ring may be formed with any of the process described above for forming the actuator ring 40.

As shown in FIG. 11A, the mechanism includes a powered rotating shaft 1030 rotating about an axis 1031 with a transmission such as a gear 1032 placed around the circumference of the rotating shaft 1030. A sleeve 1034 projects from the gear 1032 in the direction of the axis 1031, and has slots therein to make the sleeve flexible so that it can be pressed against the shaft 1030 by the clutch ring 1020. The slots in the sleeve 1034 also permit the sleeve to exert a restoring force on the clutch ring, to help restore it to its deformed shape when current is withdrawn from the clutch ring. The diameter of the clutch ring 1020 is chosen such that it fits over the sleeve 1034 when it is in its original (i.e., cooled) shape, with the inner surface 1022 of the clutch ring bearing against the sleeve 1034. The diameter of the clutch ring is also chosen to account for any hysteresis effects of the material chosen to manufacture the clutch ring. The completed assembly is shown in FIG. 10B, with the gear 1032 placed around the circumference of the shaft 1030 and the clutch ring 1020 placed around the circumference of the sleeve 1034. The positive and negative brushes 1024 and 1026 are in sliding contact with the clutch ring 1020. FIG. 10C shows a cross section of the completed assembly, with gear 1032 and the clutch ring 1020 placed on the rotating shaft 1030. The shaft 1030 is surrounded by the gear 1032 and the sleeve 1034, and the sleeve 1034 is encircled by the clutch ring 1020 with its inner surface 1022 bearing against the sleeve. Brushes 1024 and 1026 are in sliding contact with the outside surface 23 of the clutch ring 1020.

In operation, the gear 1032 is placed on the rotating shaft, and the clutch ring 1020 is placed circumferentially around the sleeve 34, as shown in FIGS. 11B and 11C. When no electric current is applied to the clutch ring 1020, the shaft 1030 rotates without also rotating the gear 1032, and no power is transmitted. As the current passes through the clutch ring, the clutch ring is heated and changes from its deformed shape to its original (contracted) shape, thus forcing the sleeve 1034 into frictional engagement with the rotating shaft 1030. As the clutch ring 1020 contracts around the sleeve 1034, friction between the shaft 1030 and the sleeve 1034 increases with the force applied by the clutch ring. The friction turns the gear 1032 which is typically meshed to another gear (not shown) mounted on a second shaft (not shown). In this regard, the gear 1032 will transmit power to its meshed gear and thereby to the second shaft. If full power transmission is needed, current is applied until the ring 1020 presses the sleeve 1034 against the shaft 1030 so that there is no slippage between the two.

If the full power of the shaft 1030 need not be transmitted to the second shaft, then the deformation of the clutch ring 1020 may be limited such that slippage occurs between the sleeve 1034 and the shaft 1030. The deformation of the clutch ring 1020 is limited by varying the duty cycle of the applied current using known techniques such as pulse width modulation (PWM). When power transmission to the gear 1040 is no longer required, the electric current through the clutch ring 1020 is switched off and the clutch ring cools down and returns to its deformed shape, thus releasing the sleeve 1034 from frictional engagement with the shaft 1030. If very close control of shaft speeds or positions is necessary, speed sensors or output positions sensors could be put on the shafts and connected to a controller, creating a feedback loop such as those used in well-known servo motors. The controller would have internal logic which would monitor the shaft speeds or positions and adjust the force applied by the clutch ring accordingly to maintain the shaft speeds within specified limits or move the shaft to a specified output position.

FIG. 12 illustrates another embodiment of a mechanism using the clutch ring 1020 to transmit power to a gear 1040 using a worm gear 1036. In this embodiment, the worm gear 1036 is placed around the circumference of the rotating shaft 1030. Sleeves 1038 project from the worm gear in the direction of the axis 1031, and are in sliding engagement with the rotating shaft 1030. Two clutch rings 1020 are positioned circumferentially around the sleeves 1038 on either side of the worm gear such that the inner surfaces 1022 of the clutch rings 1020 bear against the sleeves 1038.

In operation, the shaft 1030 initially rotates freely without rotating the worm gear 1036 and transmitting power to the gear 1040. When power transmission to gear 1040 is required, a current is applied across one or both of the clutch rings 1020, causing them to contract around the sleeves 1038, and forcing the sleeves 1038 into frictional engagement with the rotating shaft 1030. When the clutch ring 1020 begins to contract, there will initially be some slippage between the sleeves 1038 and the shaft 1030, so that the worm gear 1036 rotates at a slower speed than the shaft and only a portion of the shaft's power is transmitted. As the clutch rings 1020 contracts further, more force is applied to the sleeves 1038 until the entire worm gear 1036 begins to rotate at the same speed as the shaft 1030, at which point the maximum amount of power is transmitted to gear 1040. When power transmission to the gear 1040 is no longer required, the electric current through the clutch rings 1020 is switched off, the clutch rings 1020 cool down and return to their original shape, and the sleeves 1038 are released from frictional engagement with the shaft 1030.

FIG. 13 illustrates a mechanism using the clutch ring 1020 to selectively transform rotational motion of the shaft 1030 into linear motion using a cam 1044. The cam 1044 is mounted circumferentially around the shaft 1030, and has a sleeve 1046 extending therefrom in the direction of the axis 1031. A clutch ring is positioned circumferentially around the sleeve 1046, the diameter D of the clutch ring 1020 being designed such that when it is in its undeflected state it keeps the sleeves 1046 in sliding engagement with the shaft 1030. In operation, when power transmission to the cam followers 1042 is desired, a current is applied to the clutch ring 1020, forcing it to change shape (contract) and exert a force on the sleeves 1046. The force on the sleeves 1046 forces them into frictional engagement with the shaft 1030 until the cam 1044 begins to rotate with the same speed as the shaft 1030. At that point the rotational motion of the shaft 1030 is transmitted into linear motion of the cam followers 1042.

FIG. 14 illustrates yet another arrangement that uses the clutch ring 1020 to selectively transmit power from a shaft 1030 to two other shafts 1076 and 1078 which are oriented perpendicular to the shaft 1030. In this arrangement, a bevel gear 4B is placed on the shaft 1030, and bevel gears 1050 and 1051 are positioned on shafts 1076 and 1078, respectively. The bevel gear 1048 meshes with bevel gears 1050 and 1051. Sleeves 1052 project from the bevel gears 1048, while sleeves 1053 and 1054 project from the bevel gears 1076 and 1078. Clutch rings 1020 are positioned circumferentially around the sleeves 1052, 1053 and 1054.

In operation, the shaft 1030 initially rotates freely without rotating the bevel gear 1048. When rotation of bevel gear 1048 is required, an electric current is applied to the clutch ring 1020, compressing sleeve 1052 into frictional engagement with the shaft 1030. Like the other mechanisms described above, the amount of power transmitted is controlled by altering the duty cycle of the current flowing through the clutch ring. As the clutch ring 1020 deforms further in response to the electric current, the sleeve 1052 is pressed against the shaft 1030 with more force, until the bevel gear 1048 eventually rotates at the same speed as the shaft 1030. As the bevel gear 1048 rotates, it meshes with the bevel gears 1050 and 1051 and begins to rotate them as well. If power transmission to both shafts 1076 and 1078 is required, then the clutch rings 1020 on sleeves 1053 and 1054 are engaged by applying an electric current to them, so that the rotation of the bevel gears 1050 and 1051 is transmitted to the shafts. If power transmission to shaft 1076 is required but transmission to shaft 1078 is not, then current is applied to the clutch ring 1020 on sleeve 1053, but not to the clutch ring 1020 on the sleeve 1054. If very close control of shaft speeds is necessary, speed sensors could be put on the shafts and connected to a controller. The controller would have internal logic which would monitor the shaft speeds and adjust the force applied by the clutch ring accordingly to maintain the speeds within specified limits.

FIG. 15 illustrates a mechanism using clutch rings 1020 to selectively created forward and reverse rotation in a shaft. Shaft 1080 has a fixed gear 1082 at one end and a clutched gear 1084 at its other end. The fixed gear 1082 is driven by gear 1086 attached to motor 1088, while the clutched gear 1084 can be selectively engaged and disengaged by clutch ring 1020 positioned around a sleeve 1085 projecting from the gear 1084. Shaft 1090 also has a fixed gear 1092 at one end and a clutched gear 1094 at the other end. The fixed gear 1092 meshes with the fixed gear 1082, thus creating the counter-rotating motions of the shafts. The clutching arrangement on clutched gear 1094 is similar to the one on clutched gear 1084. A third shaft 1096 has a fixed gear 1098 near its end that meshes with both clutched gears 1084 and 1094.

In operation, the counter-rotating shafts 1080 and 1090 turn in opposite directions. When the third shaft 1096 must be rotated one direction, the proper clutch ring 1020 on one of the clutched gears 1084 or 1094 is engaged, while the other clutch ring is not engaged. When a reversal rotation of the third shaft is required, the previously engaged clutch ring is disengaged, and the previously engaged clutch ring is engaged, thus changing the direction of rotation of the third shaft. Note that clutched gears 1084 and 1094 cannot be engaged at the same time, as the system would stop abruptly and could lead to mechanical damage of the gears. Like the other mechanisms described above, the power transmitted by the clutched gears 1084 and 1094 to the third shaft 1096 can be regulated by allowing slippage of the clutched gears. Slippage is accomplished by regulating the current to the clutch rings 1020, thus regulating the extent of their contraction and the frictional force between the shafts and the gear sleeves.

FIG. 16B illustrates a mechanism using an alternative embodiment clutch ring 1066 shown in FIG. 16A. The mechanism is identical to the mechanism of FIG. 14 and operates in the same way. The only difference is the use of the clutch ring 1066, shown in FIG. 16A, instead of the clutch ring 1020. The clutch ring 1066 consists of two conductor rings 1068 and 1070 which are interconnected by a helical coil 1072 made from a smart material. The conductor rings are made from a electrically conductive material such as copper. The coil is preferably made from SMA wire (typically 0.01 in. diameter). The conductor rings 1068 and 1070 of the clutch ring 1066 are fixed to the sleeve 1085 of the gear 1084, so that they do not rotate relative to each other. When power transfer is required, current is applied to the conductor rings 1068 and 1070 via brushes 1024 and 1026. The current passes from the conductor rings into the helical coil 1072 causing the helical coil to contract and tighten around the collar and forcing the collar into frictional engagement with the shaft 1080, thus causing the gear 1084 to rotate. This embodiment offers quicker response time when the current is removed, because the helical coil 72 cools much faster than, for example, the clutch ring 1020.

FIG. 17 illustrates a mechanism a clutch ring 1056 which is secured to the cavity of a gear. The clutch ring 1056 is keyed or otherwise secured to the gear 1084 so that it cannot rotate relative to the gear. Flanges 1060 retain the clutch ring within the gear cavity. The mechanism is otherwise identical to the mechanism of FIG. 16 and operates in the same way. The only difference is the use of the clutch ring 1056 rather than the clutch ring 1066.

When power transfer is required, current is applied to the flanges 1060 via brushes 1024 and 1026. The current passes from the flanges into the cylindrical portion 1058, causing the cylindrical portion to change shape and tighten around the shaft, thus causing frictional engagement with the shaft and causing the gear 1084 to rotate.

FIG. 18 illustrates a mechanism using a clutch actuator that is not ring-shaped, but nonetheless uses materials, i.e., smart material, that change size, shape, or both to engage and disengage a clutch. Shaft 1100 has a fixed gear 1102 on one end and a fixed clutch plate 1104 on its other end, the clutch plate having an engagement surface 1106. A second shaft 1108 has a fixed gear 1110 on its end, the fixed gear having an engagement surface 1112 engageable with the engagement surface 1106. A fork 1114 is positioned between a stop 1116 axially fixed relative to the shaft 1108 and the gear 1110. The fork is biased towards the fixed stop by a torque tube 1118 connected to one end of the fork. An actuator 1120 extends between, and connects to, the end of the fork 1114 and a fixed point 1122. The fixed point does not rotate with either shaft. The actuator is a length of SMA, EAP or EAC material. In operation, when power transmission between shaft 1100 and 1108 is desired, a current is applied to the actuator 1120, causing it to contract and pull on the fork 1114, thus pulling the engagement surface 1112 into frictional engagement with the engagement surface 1106 and causing shaft 1108 to rotate. When current is removed from the actuator 1120, the torque tube 1118 slides the fork towards the fixed stop 1116 thus disengaging the engagement surfaces 1112 and 1106.

Figure 19:
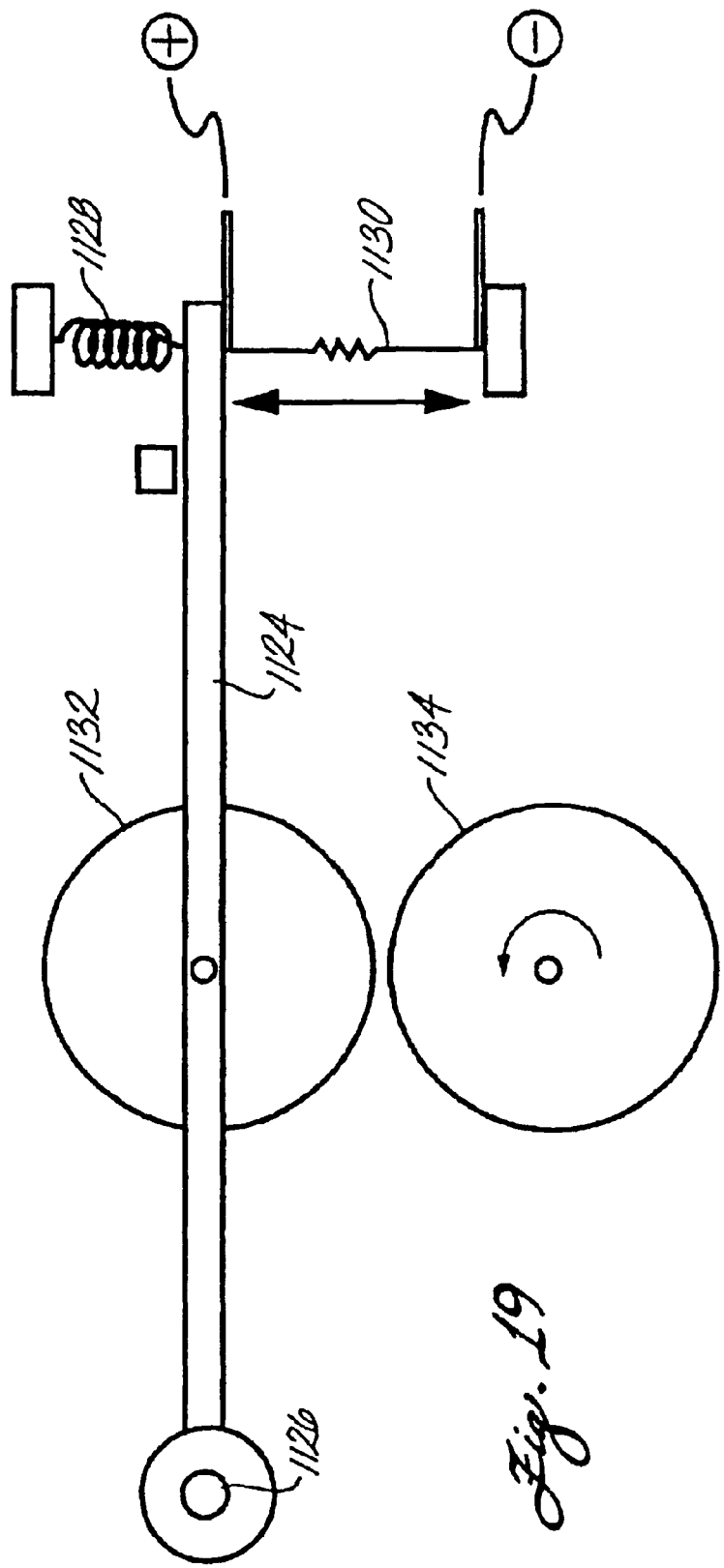
FIG. 19 is a side view of another embodiment mechanism using a smart material clutch actuator.

FIG. 19 illustrates a clutch mechanism in the form of a pinch roller arrangement using an actuator that changes shape when an electric current is applied. The mechanism includes an arm 1124 having one end mounted to a structure via a pivot 1126 and the other end attached to both a biasing spring 1128 and an actuator 1130, which is preferably a strip of a smart material. Somewhere between the ends of the arm 1124 is mounted a friction wheel 1132 that can be brought into contact with a drive wheel 1134 by the movement of the arm 1124. The biasing spring biases the clutch toward the disengaged position and keeps the clutch disengaged until a current is applied to the actuator 1130. When current is applied to the actuator 1130 it contracts and pulls the end of the arm 1124 against the biasing force of the spring 1128. As the arm 124 rotates about the pivot 126 the friction wheel 1132 is brought into frictional engagement with the drive wheel 1134 and power is transmitted from the drive wheel to the friction wheel. Although shown as friction rollers, both the drive wheel and the friction wheel could be other elements, such as splined gears or regular toothed gears. In alternate embodiment, the spring may bias the clutch toward the engaged position and the actuator may bias the clutch toward the disengaged position.

Figure 20:
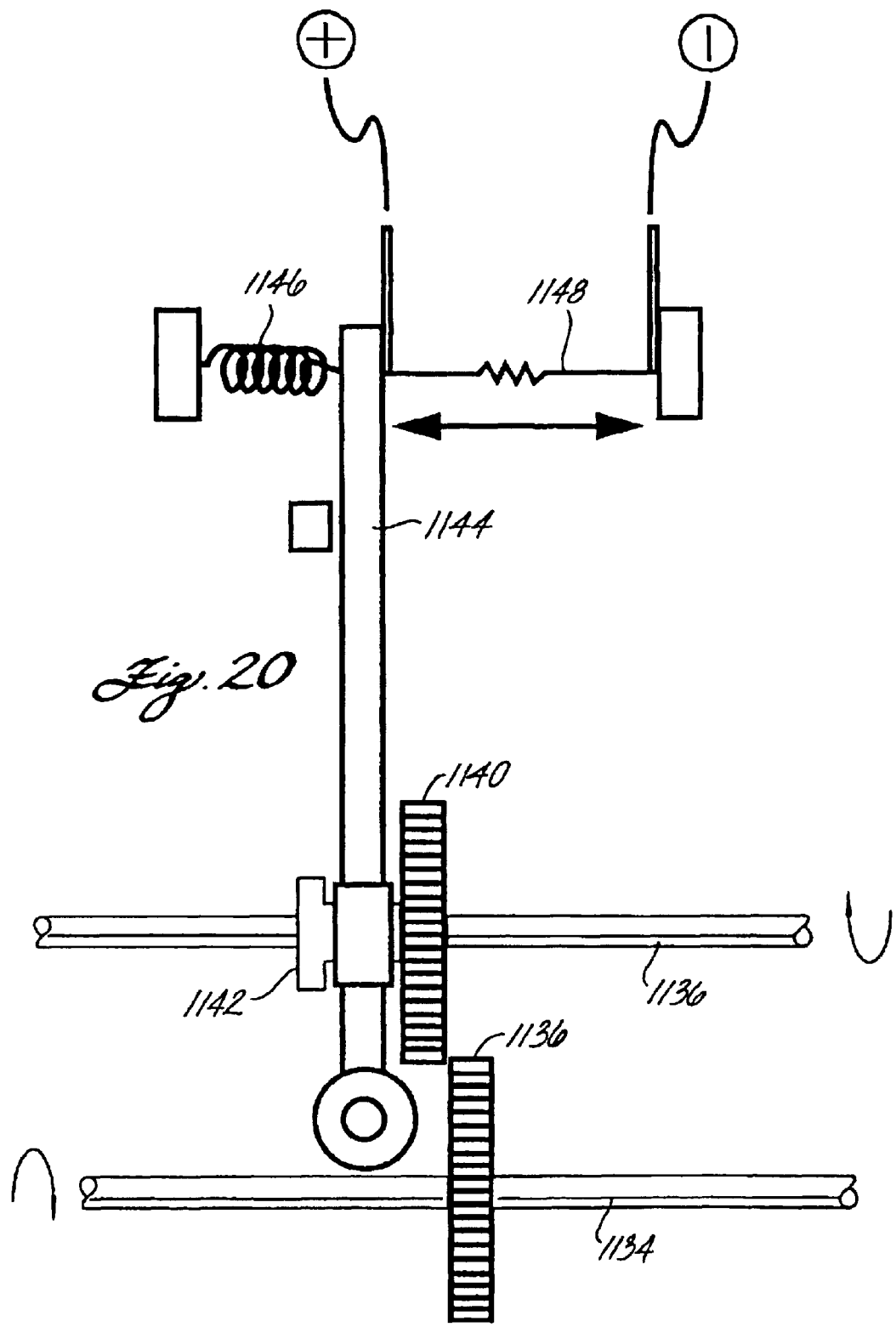
FIG. 20 is a side view of an alternate embodiment mechanism using a smart material clutch actuator.

FIG. 20 illustrates another mechanism similar to a pinch roller. In this mechanism, a powered shaft 1134 has a fixed gear 1136 attached to it. A second shaft 1138 has a gear 1140 mounted thereon. The gear 1140 is axially fixed relative to the shaft 1138. In other words, while the gear may be able to rotate relative to the shaft, it can not move along the shaft axis. A stop 1142 is also on the shaft 1138 which is also fixed in an axial direction relative to the shaft. A fork 1144 is positioned between the stop 1142 and the gear 1140. The gears 1136 and 1140 will normally be splined gears, but may be other types of gears as well. A fork 1144 is pivotally fixed on one end and connected to a biasing spring 1146 and an actuator 1148 on the other end. The actuator can be made using any of the above-mentioned smart materials that change shape upon application of an electric current. Each of the spring and the actuator are connected to some fixed point. The spring 1146 biases the fork toward a position where the gears 1136 and 1140 are disengaged from each other. In operation, the powered shaft 1134 and the gear 1136 initially spin without transmitting power to the second shaft 1138. When power transmission is required, a current is applied to the actuator 148, causing it to change shape and pull the end of the fork against the load of the biasing spring 1146. As the fork moves, it slides the gear 1140 toward the gear 1136 until both gears mesh and power is transmitted to the gear 1140 and the shaft 1138. In alternate embodiment, the spring may bias the fork toward the position where the gears 1136 and 1140 are engaged and the actuator may bias the fork in a direction disengaging the gears.

In the embodiments shown in FIGS. 18, 19 and 20 the actuators may also be made from a smart material wire for rapid response or from a smart material stamped plate.

Figure 21:
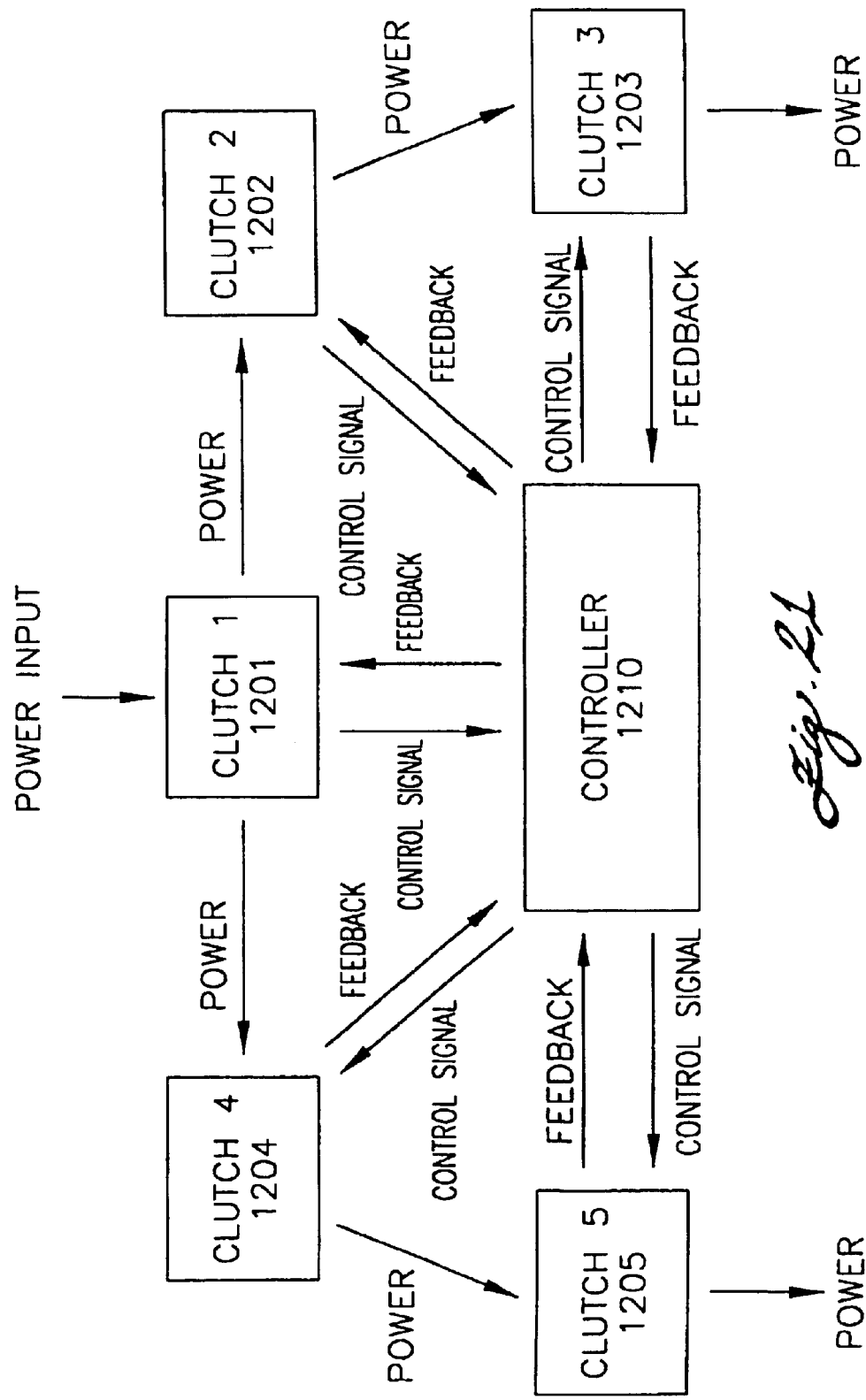
FIG. 21 is a block diagram of a system using a controller to selectively create and control a plurality of power outputs using a single power input.

FIG. 21 illustrates a system using a plurality of clutch rings to selectively control multiple outputs generated by a single power input. In this diagram, the power input of the shaft 1030 enters into clutch 1200 which then transmits the power to clutches 1202 and 1204. Each of clutches 1202 and 1204 can then be made to transmit the power on to clutches 1203 or 1205. All the clutches are linked together by a central controller 1210. The controller is programmed to selectively activate the clutches 1201 through 1205 to effect the desired distribution of the input power from the shaft 1030. Such a system could be coupled with one or more of the clutch actuators and mechanisms described above and used to provide a robotic toy with truly independent movements.

All of the aforementioned clutch embodiments have the important advantage of having rapid response times and virtually no inertial startup problems. The clutch actuators such as clutch ring 1020 respond very quickly to applied currents, particularly if made using EACs and EAPs. The quick response of the actuators, coupled with the fact that the powered shaft is already in motion before the actuators engage the transmission, e.g., gear, onto the shaft, allows almost instant engagement and disengagement of the transmission (gear). Thus, the clutch actuators eliminate or reduce the inertial startup problem encountered with actuators such as electric motors.

The gear, clutch plates and clutch rings are preferably made of Delrin or Acetol but may also be made from other plastics such as Nylon and various other engineered thermoplastics. The connector plate or ring plates comprise from an electrically conductive material. A typical clutch gear assembly can have a diameter less than ½ inch. Furthermore, a clutch system may comprise any of the different types of clutch/gear assemblies described herein driven by a single motor. Moreover, the gear/clutch assemblies driven by a single motor in a clutch system may each be actuated by a different type of smart material.

Figure 22:
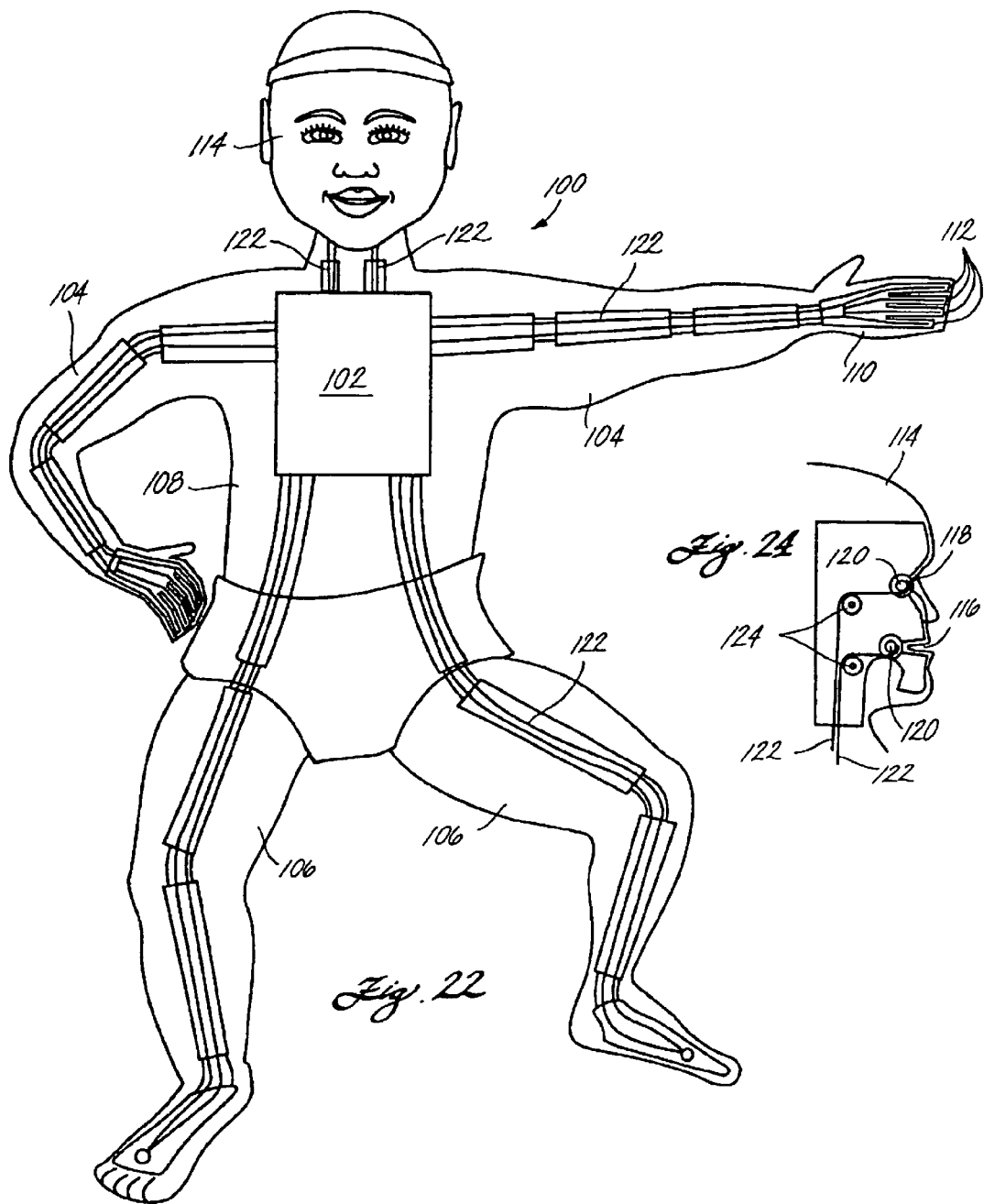
FIG. 22 is a cross-sectional view of a toy doll that incorporates a motor and clutch assembly/gear assembly of the present invention.
Figure 23:
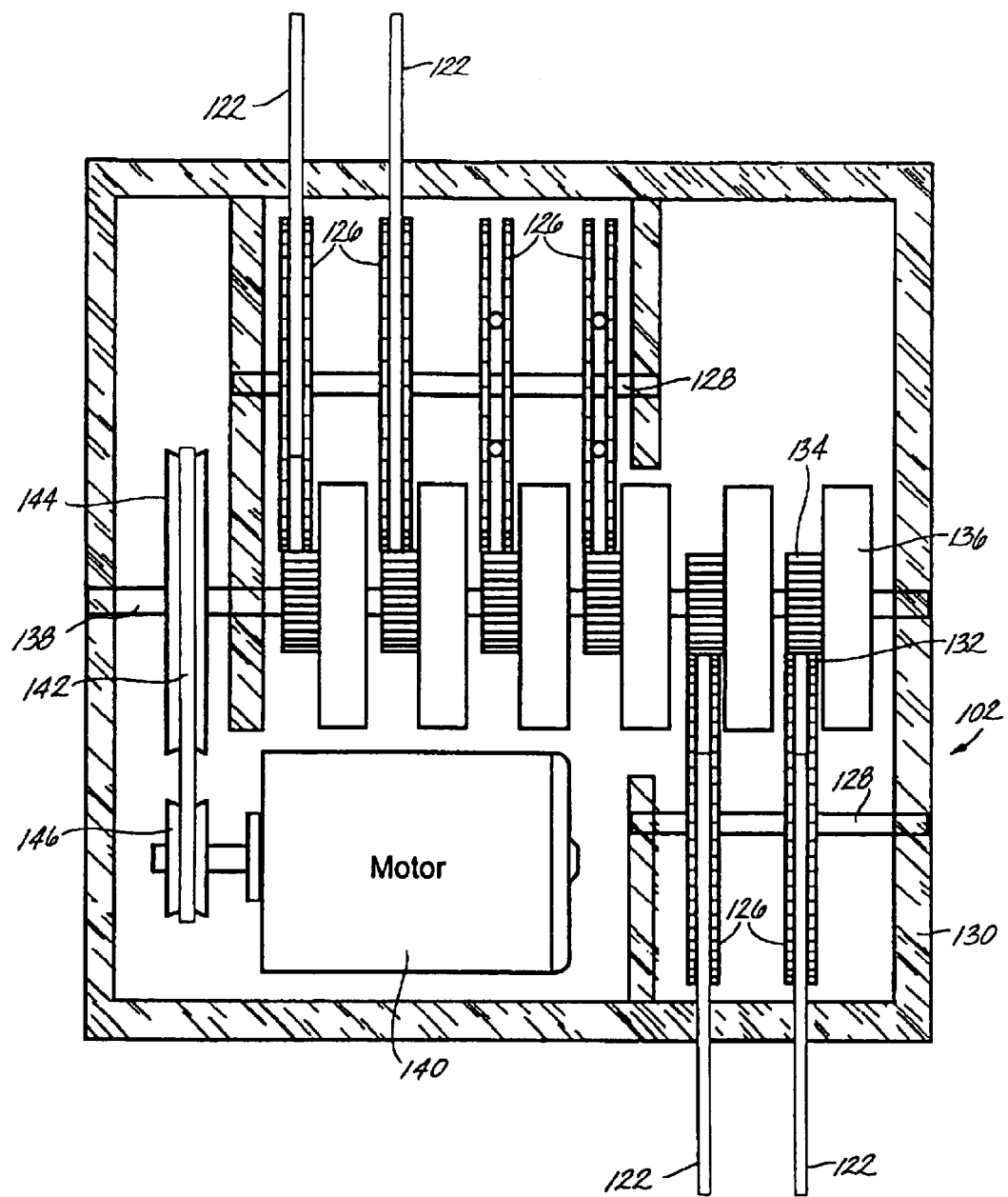
FIG. 23 is a cross-sectional view showing a motor and clutch/gear assembly.
Figure 7:
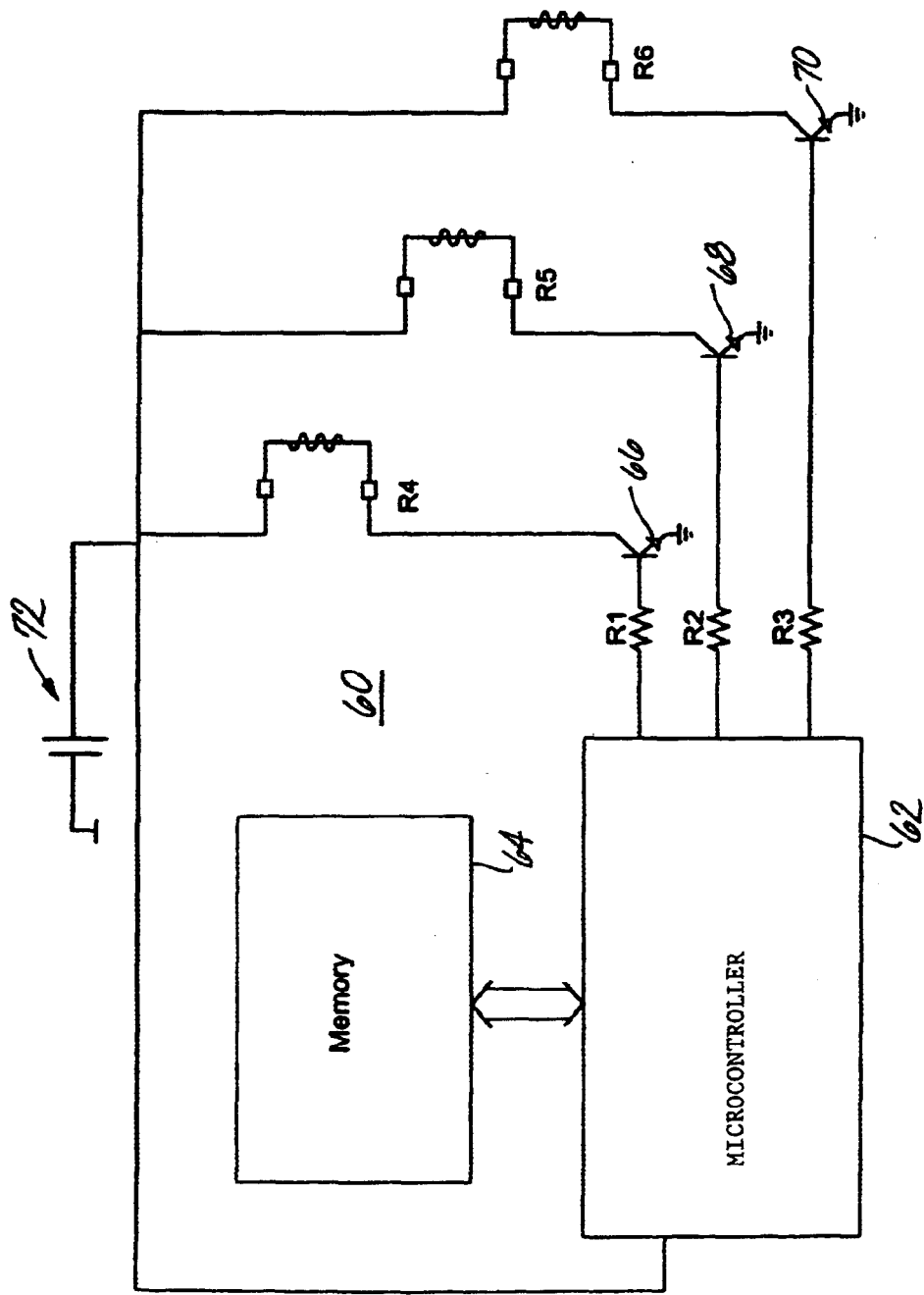

FIGS. 22, 23 and 24 show an embodiment of a toy 100 that includes a motor and clutch assembly 102 which may comprise any of the aforementioned clutch/gear assemblies. The toy 100 may include a pair of articulate arms 104 and a pair of articulate legs 106 that extend from a torso 108. Each arm 104 may include a hand 110 with a plurality of articulate fingers 112. The toy 100 may further have a head 114 that includes an articulate mouth 116 and articulate eyes 118. Each articulate member may include an actuating wheel 120 that can rotate to move the member. The toy 100 may have a plurality of belts 122 that are attached to the actuating wheels 120. The toy 100 may also have a plurality of idler wheels 124 to maintain the tension of the belts 122.

As shown in FIG. 23, the belts 122 may be attached to corresponding pulleys 126. The pulleys 126 may rotate relative to shafts 128 that are attached to a housing 130 of motor and clutch assembly 102. Each pulley 126 may have outer gear teeth 132 that mate with corresponding gear teeth 134 of a gear/clutch assembly 136. The gear/clutch assemblies 136 may be coupled to a drive shaft 138. The drive shaft 138 may be coupled to a motor 140 by a belt 142 and pulleys 144 and 146.

The gear/clutch assemblies 136 may be connected to an electrical system (not shown) that can individually switch the gear/clutch assemblies 136 between engaged and disengaged states. When switched to the engaged state a gear/clutch assembly 136 rotates the corresponding pulley 126 and moves the attached belt 122. Movement of the belt 122 rotates the actuating wheel 120 and moves the attached articulate member 104, 106, 112, 116 or 118.

The electrical system may switch the gear/clutch assemblies between the engaged and disengaged states in accordance with a software program. The software program can include input from sensors (not shown) of the toy 100. The toy 100 may have a motion sensor or light sensor (not shown) that provides input to the system. For example, the electrical system may engage the gear/clutch assemblies coupled to the eyes to open the same when a certain level of light is detected by the system.

The system can create independent movement of the articulate members 104, 106, 112, 116 or 118. The independent articulation of the members may create a more lifelike" movement of the toy 100. By coupling the articulate members to the various gear/clutch assemblies 136, the present invention allows independent movement of multiple members using a single motor 140. Using a single motor 140 reduces the cost and increases the reliability of the toy 100.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

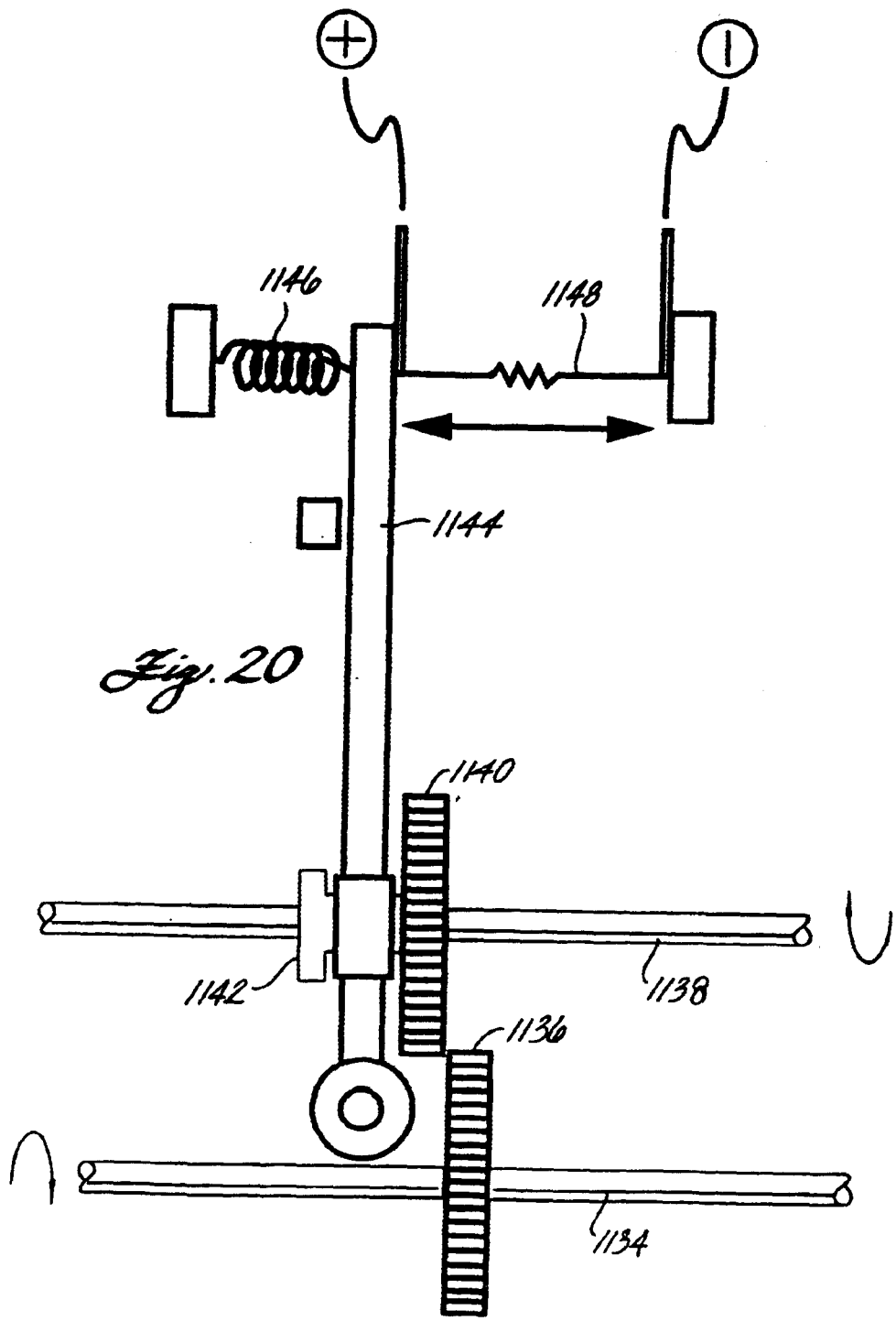

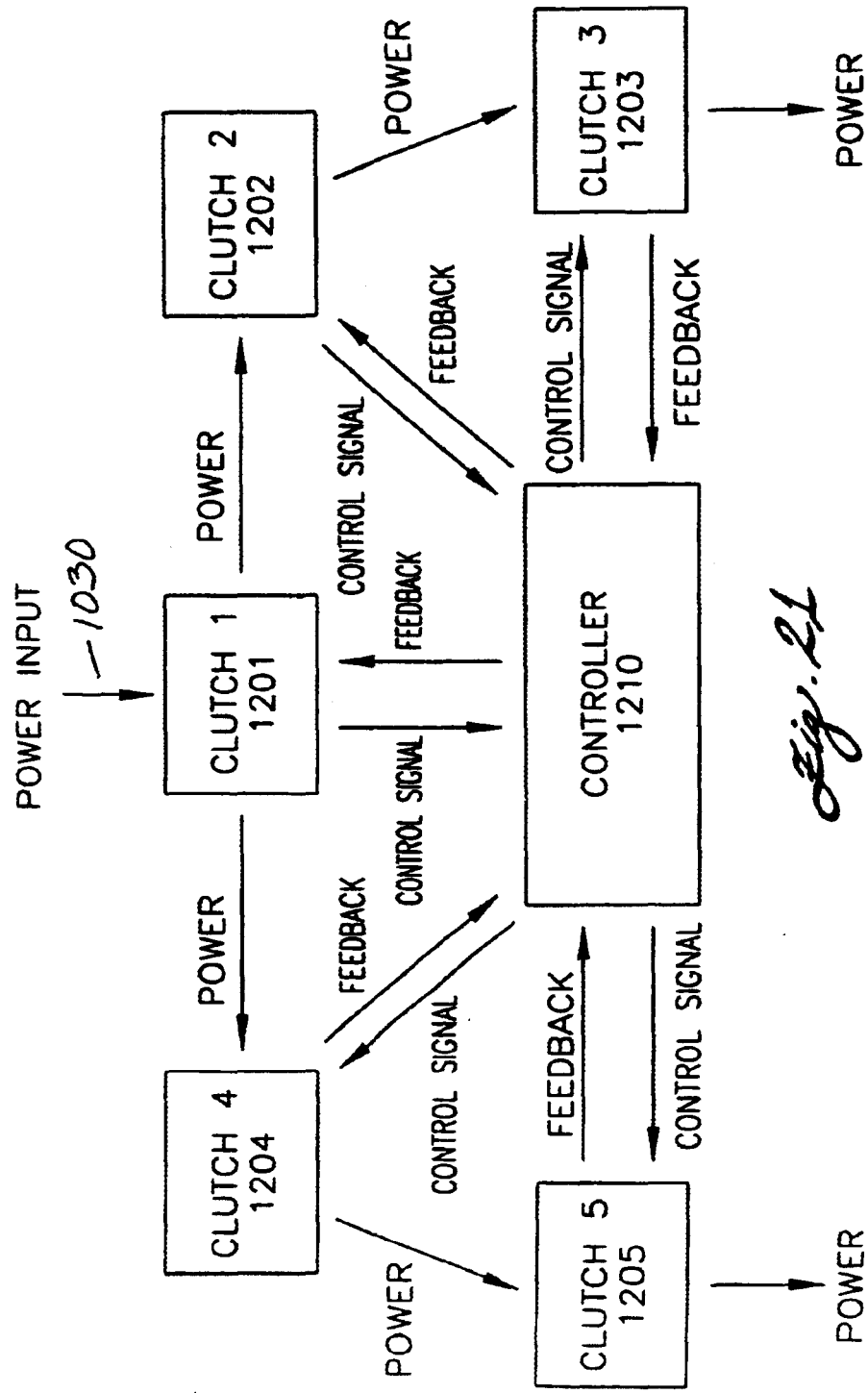

What is claimed is:

1. A clutch system comprising:
   a driving member coupled to a motor;
   a clutch for engaging the driving member and transferring power from the driving member to a first driven member comprising,
   a clutch surface for engaging the driving member,
   a shape altering material coupled to the clutch surface, wherein the shape altering material can achieve a first shape and a second shape, wherein the shape altering material achieves one of said first or second shapes when supplied with energy and achieves the remaining one of said first or second shapes when it is not supplied with energy, wherein as the shape altering material achieves a first shape it applies a force for causing the clutch surface to engage and be driven by said driving member and wherein when the shape altering material achieves a second shape it allows the clutch surface to disengage from the driving member; and
   an energy source coupled to the shape altering material.

2. A system as recited in claim 1 further comprising a second clutch for engaging said driving member and transferring power from the driving member to a second driven member.

3. A system as recited in claim 1 wherein the driving member is a shaft.

4. A system as recited in claim 1 wherein each of said first and second driven members are gears.

5. A system as recited in claim 1 wherein the driving member is a cylindrical surface coupled to a shaft driven by the motor, wherein rotation of the shaft rotates the cylindrical surface.

6. A system as recited in claim 5 wherein the clutch surface is an inner surface of an annular clutch plate surrounding the cylindrical surface and wherein the shape altering material is a wire wrapped at least around a portion of the clutch plate for causing the clutch plate inner surface to compress over the cylindrical surface.

7. A system as recited in claim 6 wherein inner surface of the clutch plate comprises ridges.

8. A system as recited in claim 6 wherein the generally annular clutch plate is an annular section.

9. A system as recited in claim 6 wherein the generally annular clutch plate forms a closed ring.

10. A system as recited in claim 9 wherein the clutch plate comprises sections of reduced thickness to accommodate radial compression of the plate.

11. A system as recited in claim 9 wherein the clutch plate comprises:
at least two annular sections each section having a first and a second end and an inner and outer surface; and
a strip extending from the outer surface of each section and interconnecting the two sections wherein the thickness of the strip is less than the thickness of each section, wherein the first end of a first section is adjacent to a second end of a subsequent second section, and wherein the first end of the first section and the second end of the second section are inclined away from each other in a radially inward direction.

12. A system as recited in claim 6 further comprising a second annular plate, wherein the clutch plate is located within the second plate and is coupled to the second plate.

13. A system as recited in claim 12 further comprising:
a slot extending from the inner portion toward the outer portion of the second plate; and
a projection extending outwardly from the clutch plate and fitted within the slot, whereby rotation of the clutch plate causes the projection to engage a wall defined by the slot on the second plate and rotate the second plate.

14. A system as recited in claim 12 wherein a portion of the clutch plate is connected to the second plate.

15. A system as recited in claim 14 further comprising:
a slot extending from the inner portion toward the outer portion of the second plate; and
a projection extending outwardly from the clutch plate and fitted within the slot, whereby rotation of the clutch plate causes the projection to engage a wall defined by the slot on the second plate and rotate the second plate.

16. A system as recited in claim 12 wherein the shape altering material is a wire, the system further comprising:
a terminal pad extending from each end of the wire wherein one terminal pad is coupled to one side surface of the annular clutch plate and wherein the second terminal pad is coupled to an opposite side surface of the annular clutch plate;
a first electrically conductive connector plate having a central opening and coupled to a first side surface of the second annular plate and coupled to the first terminal pad; and
a second electrically conductive connector plate having a central opening coupled to a second side surface of the second annular plate opposite the first side surface and coupled to the second terminal pad, wherein the energy source is coupled to the first and second connector plates.

17. A system as recited in claim 16 further comprising:
a first electrical brush coupled to the energy source and coupled to the first connector plate; and
a second electrical brush coupled to the energy source and to the second connector plate.

18. A system as recited in claim 16 further comprising a geared surface extending laterally from one of said first and second connector plates and coaxially with said clutch plate wherein said geared surface surrounds the opening of said one connector plate.

19. A system as recited in claim 16 wherein a geared surface is formed on the outer surface of the second annular plate.

20. A system as recited in claim 1 wherein the shape altering material comprises a material selected from the group consisting of shape memory alloys, electroceramics and electroactive polymers.

21. A system as recited in claim 2 further comprising another shape altering material coupled to the second clutch, said another altering material having a first shape or a second shape when supplied with energy and having the other of said first and second shapes when not supplied with energy, wherein as said another shape altering material achieves a first shape is causes the second clutch to engage the driving member and be driven by said driving member thereby transferring power from the driving member to the second driven member.

22. A system as recited in claim 1 wherein the clutch surface is an inner surface of a clutch plate and wherein the shape altering material is mounted on the clutch plate.

23. A system as recited in claim 22 wherein when the driving member drives the clutch surface, the driving member drives the clutch plate along with the shape altering material.

24. A clutch/gear assembly:
an annular clutch having an inner surface for engaging a driving member and an outer surface opposite the inner surface and opposite side surfaces therebetween;
an annular member, wherein the clutch is located within the annular member and is coupled to said annular member; and
a shape altering material wire around the outer surface, wherein the shape altering material wire can achieve a first shape and a second shape, wherein the shape altering material wire achieves one of said first or second shapes when supplied with energy and achieves the remaining one of said first or second shapes when it is not supplied with energy, wherein as the shape altering material wire achieves a first shape it applies a force for causing the engagement of the annular clutch inner surface with the driving member such that the driving member drives the annular clutch and wherein when the shape altering material wire achieves a second shape it allows the clutch to return to its original position.

25. A system as recited in claim 24 wherein inner surface of the clutch comprises ridges.

26. A system as recited in claim 24 wherein the generally annular clutch plate is an annular section.

27. A system as recited in claim 24 wherein the generally annular clutch plate forms a closed ring.

28. A system as recited in claim 27 wherein the clutch plate comprises sections of reduced thickness to accommodate radial compression of the plate.

29. A system as recited in claim 27 wherein the clutch plate comprises:
   at least two annular sections each section having a first and a second end and an inner and outer surface; and
   a strip extending from the outer surface of each section and interconnecting the two sections wherein the thickness of the strip is less than the thickness of each section, wherein the first end of a first section is adjacent to a second end of a subsequent second section, and wherein the first end of the first section and the second end of the second section are inclined away from each other in a radially inward direction.

30. A system as recited in claim 24 comprising:
   a slot formed on the annular member; and
   a projection extending outwardly from the clutch and fitted within the slot, whereby rotation of the clutch causes the projection to engage a wall defined by the slot on the annular member and rotate the annular member.

31. A system as recited in claim 24 wherein a portion of the clutch is connected to the annular member.

32. A system as recited in claim 31 further comprising:
   a slot formed on the annular member; and
   a projection extending outwardly from the clutch and fitted within the slot, whereby rotation of the clutch causes the projection to engage a wall defined by the slot on the annular member and rotate the annular member.

33. A system as recited in claim 24 further comprising:
   a terminal pad extending from each end of the wire wherein one terminal pad is coupled to one side surface of the annular clutch and wherein the second terminal pad is coupled to an opposite side surface of the annular clutch;
   a first electrically conductive connector plate for coupling to an energy source and having a central opening and coupled to a first side surface of the annular member and coupled to the first terminal pad; and
   a second electrically conductive connector plate for coupling to an energy source and having a central opening and coupled to a second side surface of the annular member opposite the first side surface and coupled to the second terminal pad.

34. A system as recited in claim 33 further comprising a geared surface extending laterally from one of said first and second connector plates and coaxially with said clutch wherein said geared surface surrounds the opening of said one connector plate.

35. A system as recited in claim 24 wherein a geared surface is formed on the outer surface of the annular member.

36. A system as recited in claim 24 wherein the shape altering material wire comprises a material selected from the group consisting of shape memory alloys, electroceramics and electroactive polymers.

37. The assembly as recited in claim 24 wherein the shape altering material wire is mounted on the annular clutch.

38. A system as recited in claim 37 wherein when the driving member drives the annular clutch, the driving member drives the annular clutch along with the shape altering material.

39. A clutch system comprising:
   a driving member coupled to a motor;
   a clutch comprising a shape altering material, the clutch comprising a clutch surface for engaging a driving member wherein the shape altering material can achieve a first shape and a second shape, wherein the shape altering material achieves one of said first or second shapes when supplied with energy and achieves the remaining one of said first or second shapes when it is not supplied with energy, wherein as the shape altering material achieves a first shape it causes the clutch surface to engage and be driven by said driving member and wherein when the shape altering material achieves a second shape the clutch surface disengages from the driving member; and
   an energy source coupled to the shape altering alloy material.

40. A clutch system as recited in claim 39 wherein the clutch further comprises a power transmitting surface.

41. A clutch system as recited in claim 40 wherein the power transmitting surface is a geared surface.

42. A clutch system as recited in claim 39 further comprising a power transmitting member coupled to the clutch for transmitting the power of the motor when the clutch surface engages the driving member.

43. A clutch system as recited in claim 42 wherein the power transmitting member is a gear.

44. A method for operating a device comprising:
   coupling a member of the device to a clutch surface;
   coupling a shape altering material to the clutch surface; and
   controlling energy applied to the shape altering material altering the shape of said shape altering material for actuating the clutch surface causing the clutch surface to couple to and be driven by a motor for moving the member.

45. A method as recited in claim 44 further comprising:
   coupling a second member of the device to a second clutch surface; coupling a second shape altering material to the second clutch surface; and
   controlling energy applied to the second shape altering material altering the shape of said second shape altering material for actuating the second clutch surface causing the second clutch surface to couple to and be driven by the motor for moving the second member.

46. A method as recited in claim 45 wherein the two clutch surfaces are actuated in accordance with a software routine.

47. A method as recited in claim 45 further comprising:
   coupling a third member of the device to a third clutch surface;
   coupling a third shape altering material to the third clutch surface; and
   controlling energy applied to the third shape altering material altering the shape of said third shape altering material for actuating the third clutch surface causing the third clutch surface to couple to and be driven by the motor for moving the third member.

48. A system as recited in claim 39 wherein when the driving member drives the clutch surface, the driving member drives the clutch with the shape altering material.

49. A clutch/gear assembly:
   an annular clutch having an inner surface for engaging a driving member and an outer surface opposite the inner surface and opposite side surfaces therebetween;
   an annular member, wherein the clutch is located within the annular member and is coupled to said annular member;
   a shape altering material wire around the outer surface, wherein the shape altering material wire can achieve a first shape and a second shape, wherein the shape altering material wire achieves one of said first or second shapes when supplied with energy and achieves the remaining one of said first or second shapes when it is not supplied with energy, wherein as the shape altering material wire achieves a first shape it applies a force for causing the engagement of the annular clutch inner surface with the driving member and wherein when the shape altering material wire achieves a second shape it allows the clutch to return to its original position;

a slot extending from an inner portion toward an outer portion of the annular member; and a projection extending outwardly from the clutch and fitted within the slot, whereby rotation of the clutch causes the projection to engage a wall defined by the slot on the annular member and rotate the annular member.

50. A clutch/gear assembly:

an annular clutch having an inner surface for engaging a driving member and an outer surface opposite the inner surface and opposite side surfaces therebetween;

an annular member, wherein the clutch is located within the annular member and is connected to said annular member;

a shape altering material wire around the outer surface, wherein the shape altering material wire can achieve a first shape and a second shape, wherein the shape altering material wire achieves one of said first or second shapes when supplied with energy and achieves the remaining one of said first or second shapes when it is not supplied with energy, wherein as the shape altering material wire achieves a first shape it applies a force for causing the engagement of the annular clutch inner surface with the driving member and wherein when the shape altering material wire achieves a second shape it allows the clutch to return to its original position;

a slot extending from an inner portion toward an outer portion of the annular member; and a projection extending outwardly from the clutch and fitted within the slot, whereby rotation of the clutch causes the projection to engage a wall defined by the slot on the annular member and rotate the annular member.

51. A clutch/gear assembly:

an annular clutch having an inner surface for engaging a driving member and an outer surface opposite the inner surface and opposite side surfaces therebetween;

an annular member, wherein the clutch is located within the annular member and is coupled to said annular member;

a shape altering material wire around the outer surface, wherein the shape altering material wire can achieve a first shape and a second shape, wherein the shape altering material wire achieves one of said first or second shapes when supplied with energy and achieves the remaining one of said first or second shapes when it is not supplied with energy, wherein as the shape altering material wire achieves a first shape it applies a force for causing the engagement of the annular clutch inner surface with the driving member and wherein when the shape altering material wire achieves a second shape it allows the clutch to return to its original position;

a terminal pad extending from each end of the wire wherein one terminal pad is coupled to one side surface of the annular clutch and wherein the second terminal pad is coupled to an opposite side surface of the annular clutch;

a first electrically conductive connector plate for coupling to an energy source and coupled to a first side surface of the annular member and coupled to the first terminal pad; and a second electrically conductive connector plate for coupling to an energy source and coupled to a second side surface of the annular member opposite the first side surface and coupled to the second terminal pad.

52. A system as recited in claim 51 further comprising a geared surface extending laterally from one of said first and second connector plates and coaxially with said clutch wherein said geared surface surrounds the opening of said one connector plate.

53. A system as recited in claim 51 wherein each of the first and electrically conductive connector plates have central openings.

* * * * *

UNITED STATES PATENT AND TRADEMARK OFFICE
CERTIFICATE OF CORRECTION

PATENT NO. : 6,902,048 B1  
APPLICATION NO. : 09/549727  
DATED : June 7, 2005  
INVENTOR(S) : Chung It is certified that error appears in the above-identified patent and that said Letters Patent is hereby corrected as shown below:

On the Title Page

(56) References Cited  
Other Publications

Insert --Bar-Cohen, et al., "Electroactive Polymers (EAP) Low Mass Muscle Actuators", Presented at the SPIE International Conference, Smart Structures and Materials Symposium, Enabling Technologies: Smart Structures and Integrated Systems, San Diego, CA, 2-6 March 1997, pp. 1-6.--

In the Specification

Column 1, line 14  
Delete "share",  
Insert --shape--

Column 3, line 1  
After "first",  
Insert --shape--

Column 3, line 7  
Delete "is to",  
Insert --is coupled to--

Column 3, line 26  
Delete "of" (second occurrence)

Column 3, line 58  
Delete "alternate an",  
Insert --an alternate--

Column 5, line 52  
Delete "ting",  
Insert --ring--

Column 6, Table 1 after line 45, Column 3, Row 1  
Delete "allows",  
Insert --alloys--

Column 8, line 38  
Delete "of the"

Column 8, line 54  
Delete "the in",  
Insert --in--

Column 9, line 11  
Delete "rotate",  
Insert --rotated--

UNITED STATES PATENT AND TRADEMARK OFFICE
CERTIFICATE OF CORRECTION

PATENT NO.       : 6,902,048 B1
APPLICATION NO. : 09/549727
DATED            : June 7, 2005
INVENTOR(S)      : Chung It is certified that error appears in the above-identified patent and that said Letters Patent is hereby corrected as shown below:

| | |
|---|---|
| Column 9, line 61 | Delete "is the", Insert --is then-- |
| Column 10, line 3 | Delete "0.20", Insert --20-- |
| Column 10, line 20 | Delete "the a", Insert --a-- |
| Column 10, line 50 | Delete "plates", Insert --plate-- |
| Column 11, line 2 | Delete "a" |
| Column 11, line 7 | After "may", Insert --be-- |
| Column 11, line 22 | Delete "wire", Insert --"wire"-- |
| Column 11, line 41 | Delete "666 if", Insert --666 is-- |
| Column 11, line 57 | Delete "$_{90}$°", Insert --90°-- |
| Column 12, line 43 | Delete "stake", Insert --staked-- |
| Column 12, line 64 | Delete "wire to", Insert --wire too-- |
| Column 12, line 65 | Delete "in:", Insert --in-- |
| Column 13, line 37 | Delete "is mates", Insert --mates-- |
| Column 13, line 45 | Delete "increase", Insert --increases-- |

UNITED STATES PATENT AND TRADEMARK OFFICE
CERTIFICATE OF CORRECTION

PATENT NO. : 6,902,048 B1  
APPLICATION NO. : 09/549727  
DATED : June 7, 2005  
INVENTOR(S) : Chung Page 3 of 7

It is certified that error appears in the above-identified patent and that said Letters Patent is hereby corrected as shown below:

| | |
|---|---|
| Column 14, line 16 | Delete "A wires", Insert --Wires-- |
| Column 14, line 34 | Delete "provide", Insert --provided-- |
| Column 14, line 54 | Delete "process", Insert --processes-- |
| Column 16, line 16 | Delete "rerum", Insert --return-- |
| Column 16, line 40 | Delete "4B", Insert --1048-- |
| Column 17, line 7 | Delete "created", Insert --create-- |
| Column 17, line 62 | After "mechanism", Insert --using-- |
| Column 19, line 22 | Delete "clutch 1200", Insert --clutch 1201-- |
| Column 20, line 31 | Delete "life-like"", Insert --"life-like"-- |

In the Claims

| | |
|---|---|
| Column 22, line 28, Claim 21 | Delete "is causes", Insert --it causes-- |
| Column 26, line 40, Claim 53 | After "first and", Insert --second-- |
| Column 26, lines 41-42, Claim 53 | Delete "have central openings", Insert --has a central opening-- |

UNITED STATES PATENT AND TRADEMARK OFFICE
CERTIFICATE OF CORRECTION

PATENT NO. : 6,902,048 B1  
APPLICATION NO. : 09/549727  
DATED : June 7, 2005  
INVENTOR(S) : Chung It is certified that error appears in the above-identified patent and that said Letters Patent is hereby corrected as shown below:

In the Drawings

| | |
|---|---|
| Fig. 7, Sheet 8 of 26 Ref. No 62 | Delete Drawing Sheet 8 and substitute therefore the Drawing Sheet, consisting of Fig. 7, as shown on the attached page |
| Fig. 20, Sheet 23 of 26 | Delete Drawing Sheet 23 and subtitute therefore the Drawing Sheet, consisting of Fig. 20, as shown on the attached page |
| Fig. 21, Sheet 24 of 26 | Delete Drawing Sheet 24 and substitute therefore the Drawing Sheet, consisting of Fig. 21, as shown on the attached page |

Signed and Sealed this

Twenty-fourth Day of October, 2006

JON W. DUDAS  
*Director of the United States Patent and Trademark Office*